US009152911B2

(12) United States Patent
Jain et al.

(10) Patent No.: US 9,152,911 B2
(45) Date of Patent: Oct. 6, 2015

(54) SWITCHING BETWEEN INTERNAL AND EXTERNAL ANTENNAS

(75) Inventors: Deepak Jain, Garland, TX (US); Tuan Quoc Dao, Richardson, TX (US)

(73) Assignee: DeviceFidelity, Inc., Richardson, TX (US)

( * ) Notice: Subject to any disclaimer, the term of this patent is extended or adjusted under 35 U.S.C. 154(b) by 0 days.

(21) Appl. No.: 13/306,588

(22) Filed: Nov. 29, 2011

(65) Prior Publication Data

US 2012/0074231 A1  Mar. 29, 2012

Related U.S. Application Data

(60) Division of application No. 12/568,592, filed on Sep. 28, 2009, now Pat. No. 8,070,057, which is a continuation-in-part of application No. 12/272,527, filed on Nov. 17, 2008, which is a continuation-in-part of application No. 12/209,087, filed on Sep. 11, 2008.

(60) Provisional application No. 60/971,813, filed on Sep. 12, 2007.

(51) Int. Cl.
*G06K 19/06* (2006.01)
*G06K 19/077* (2006.01)
(Continued)

(52) U.S. Cl.
CPC ...... *G06K 19/07749* (2013.01); *G06K 7/10237* (2013.01); *G06K 19/07732* (2013.01); *G06K 19/07741* (2013.01); *G06K 19/07767* (2013.01); *G06Q 20/3278* (2013.01); *G06Q 20/341* (2013.01); *G06Q 20/352* (2013.01);
(Continued)

(58) Field of Classification Search
USPC .................... 235/375, 380, 486, 492
See application file for complete search history.

(56) References Cited

U.S. PATENT DOCUMENTS 3,713,148 A  1/1973  Cardullo et al.
4,614,861 A  9/1986  Pavlov et al.
(Continued)

FOREIGN PATENT DOCUMENTS

CN  1610918  4/2005
CN  101271538  9/2009
(Continued)

OTHER PUBLICATIONS

Onelook Dictionary Search; Definitions of firmware; Jul. 5, 2011; 2 pages.
(Continued)

*Primary Examiner* — Rafferty Kelly
(74) *Attorney, Agent, or Firm* — Fish & Richardson P.C.

(57) ABSTRACT

The present disclosure is directed to a system and method for switching between internal and external antennas. In some implementations, a system includes an antenna, a connector, and a housing. The antenna is configured to communicate wirelessly transactions with transaction terminals. The connector is connected to the antenna and configured to connect a transaction card to the antenna in response to at least insertion in the housing. The housing enclosing at least a portion of the antenna and at least a portion of the connector and including one or more elements that form an opening for receiving the transaction card. In addition, the housing is substantially rectangular and includes a first portion with a first thickness and a second portion with a second thickness different from the first thickness and at least the thickness of the transaction card.

15 Claims, 22 Drawing Sheets

(51) Int. Cl.

| | | |
|---|---|---|
| *G06K 7/10* | (2006.01) | |
| *G06Q 20/32* | (2012.01) | |
| *G06Q 20/34* | (2012.01) | |
| *G07F 7/08* | (2006.01) | |
| *G07F 7/10* | (2006.01) | |
| *H01Q 1/22* | (2006.01) | |
| *H01Q 1/38* | (2006.01) | |
| *H01Q 7/00* | (2006.01) | |
| *H04M 15/00* | (2006.01) | |
| *G06K 17/00* | (2006.01) | |
| *H04M 1/02* | (2006.01) | |
| *H04M 1/725* | (2006.01) | |
| *H04W 12/06* | (2009.01) | |
| *H04W 88/00* | (2009.01) | |
| *H04W 88/02* | (2009.01) | |

(52) U.S. Cl.
CPC ........ *G06Q20/3574* (2013.01); *G06Q 20/3576* (2013.01); *G07F 7/0806* (2013.01); *G07F 7/1008* (2013.01); *H01Q 1/22* (2013.01); *H01Q 1/2216* (2013.01); *H01Q 1/2225* (2013.01); *H01Q 1/2283* (2013.01); *H01Q 1/38* (2013.01); *H01Q 7/00* (2013.01); *H04M 15/77* (2013.01); *H04M 15/774* (2013.01); *G06K 2017/0041* (2013.01); *H04M 1/0274* (2013.01); *H04M 1/72575* (2013.01); *H04M 2215/7254* (2013.01); *H04M 2215/7272* (2013.01); *H04W 12/06* (2013.01); *H04W 88/00* (2013.01); *H04W 88/02* (2013.01); *Y10T 29/49016* (2015.01)

(56) References Cited

U.S. PATENT DOCUMENTS

| | | | |
|---|---|---|---|
| 4,766,293 | A | 8/1988 | Boston |
| 4,797,542 | A | 1/1989 | Hara |
| 4,876,441 | A | 10/1989 | Hara et al. |
| 5,140,517 | A | 8/1992 | Nagata et al. |
| 5,180,902 | A | 1/1993 | Schick et al. |
| 5,272,319 | A | 12/1993 | Rey |
| 5,276,311 | A | 1/1994 | Hennige |
| 5,428,684 | A | 6/1995 | Akiyama et al. |
| 5,434,398 | A | 7/1995 | Goldberg |
| 5,528,222 | A | 6/1996 | Moskowitz et al. |
| 5,657,373 | A | 8/1997 | Hermansson et al. |
| 5,729,607 | A | 3/1998 | DeFries et al. |
| 5,748,737 | A | 5/1998 | Daggar |
| 5,768,370 | A | 6/1998 | Maatta et al. |
| 5,801,661 | A | 9/1998 | Suzuki |
| 5,834,747 | A | 11/1998 | Cooper |
| 6,029,892 | A | 2/2000 | Miyake |
| 6,032,859 | A | 3/2000 | Muehlberger et al. |
| 6,041,305 | A | 3/2000 | Sakurai |
| 6,045,043 | A | 4/2000 | Bashan et al. |
| 6,073,840 | A | 6/2000 | Marion |
| 6,073,856 | A | 6/2000 | Takahashi |
| 6,078,806 | A | 6/2000 | Heinonen et al. |
| 6,233,683 | B1 | 5/2001 | Chan et al. |
| 6,308,890 | B1 | 10/2001 | Cooper |
| 6,347,218 | B1 | 2/2002 | Fuhrmann et al. |
| 6,407,914 | B1 | 6/2002 | Helot |
| 6,418,326 | B1 | 7/2002 | Heinonen et al. |
| 6,484,259 | B1 | 11/2002 | Barlow |
| 6,533,178 | B1 | 3/2003 | Gaul et al. |
| 6,625,425 | B1 | 9/2003 | Hughes et al. |
| 6,634,564 | B2 | 10/2003 | Kuramochi |
| 6,764,005 | B2 | 7/2004 | Cooper |
| 6,771,981 | B1 | 8/2004 | Zalewski et al. |
| 6,829,711 | B1 | 12/2004 | Kwok et al. |
| 6,853,987 | B1 | 2/2005 | Cook |
| 6,891,811 | B1 | 5/2005 | Smith et al. |
| 6,920,338 | B2 | 7/2005 | Engstrom et al. |
| 6,961,587 | B1 | 11/2005 | Vilppula et al. |
| 6,970,130 | B1 | 11/2005 | Walters et al. |
| 7,012,572 | B1 | 3/2006 | Schaffner et al. |
| 7,054,660 | B2 | 5/2006 | Lord |
| 7,079,832 | B2 | 7/2006 | Zalewski et al. |
| 7,083,094 | B2 | 8/2006 | Cooper |
| 7,113,139 | B2 | 9/2006 | Charrat |
| 7,128,274 | B2 | 10/2006 | Kelley et al. |
| 7,133,659 | B2 | 11/2006 | Zalewski et al. |
| 7,147,165 | B2 | 12/2006 | Mongin et al. |
| 7,155,199 | B2 | 12/2006 | Zalewski et al. |
| 7,183,505 | B2 | 2/2007 | Mongin et al. |
| 7,224,797 | B2 | 5/2007 | Freeman et al. |
| 7,228,155 | B2 | 6/2007 | Saunders |
| 7,232,061 | B2 | 6/2007 | Furuyama et al. |
| 7,237,049 | B2 | 6/2007 | Kang et al. |
| 7,286,818 | B2 | 10/2007 | Rosenberg |
| 7,290,716 | B2 | 11/2007 | Ito |
| 7,305,260 | B2 | 12/2007 | Vuoir et al. |
| 7,334,732 | B2 | 2/2008 | Cooper |
| 7,343,184 | B2 | 3/2008 | Rostami |
| 7,364,092 | B2 | 4/2008 | Narendra et al. |
| 7,395,975 | B2 | 7/2008 | Ito |
| 7,407,094 | B2 | 8/2008 | Myers et al. |
| 7,494,068 | B2 | 2/2009 | Patrice |
| 7,509,487 | B2 | 3/2009 | Lu et al. |
| 7,530,495 | B2 | 5/2009 | Cooper |
| 7,537,169 | B2 | 5/2009 | Gonzalez et al. |
| 7,575,177 | B2 | 8/2009 | Killian et al. |
| 7,580,678 | B2 | 8/2009 | Byman-Kivivuori et al. |
| 7,581,678 | B2 | 9/2009 | Narendra et al. |
| 7,588,184 | B2 | 9/2009 | Gandel et al. |
| 7,597,259 | B2 | 10/2009 | Nishikawa et al. |
| 7,599,857 | B2 | 10/2009 | Bishop et al. |
| 7,601,031 | B2 | 10/2009 | Tanaka et al. |
| 7,604,176 | B2 | 10/2009 | Bates et al. |
| 7,606,560 | B2 | 10/2009 | Labrou et al. |
| 7,609,946 | B2 | 10/2009 | Schedivy |
| 7,620,431 | B2 | 11/2009 | Hawkins et al. |
| 7,623,832 | B2 | 11/2009 | Watanabe et al. |
| 7,657,255 | B2 | 2/2010 | Abel et al. |
| 7,707,113 | B1 | 4/2010 | DiMartino et al. |
| 7,719,613 | B2 | 5/2010 | Kayanuma |
| 7,748,031 | B2 | 6/2010 | Gonzalez et al. |
| 7,774,231 | B2 | 8/2010 | Pond et al. |
| 7,789,313 | B2 | 9/2010 | Degauque et al. |
| 7,802,719 | B2 | 9/2010 | Johnson et al. |
| 7,805,615 | B2 | 9/2010 | Narendra et al. |
| 7,821,399 | B2 | 10/2010 | Otranen |
| 7,885,870 | B2 | 2/2011 | Nam et al. |
| 8,070,057 | B2 | 12/2011 | Jain et al. |
| 8,120,716 | B2 | 2/2012 | Vitito |
| 2001/0006902 | A1 | 7/2001 | Ito |
| 2001/0054087 | A1 | 12/2001 | Flom et al. |
| 2002/0017557 | A1 | 2/2002 | Hendrick |
| 2002/0023215 | A1 | 2/2002 | Wang et al. |
| 2002/0055368 | A1 | 5/2002 | Lee |
| 2002/0065902 | A1 | 5/2002 | Janik et al. |
| 2002/0128029 | A1 | 9/2002 | Nishikawa et al. |
| 2003/0046365 | A1 | 3/2003 | Pfister et al. |
| 2003/0046567 | A1 | 3/2003 | Carman |
| 2003/0052168 | A1* | 3/2003 | Wong ............................ 235/451 |
| 2003/0064689 | A1 | 4/2003 | Engstrom et al. |
| 2003/0085288 | A1 | 5/2003 | Luu |
| 2003/0100338 | A1 | 5/2003 | Lee |
| 2003/0135463 | A1 | 7/2003 | Brown et al. |
| 2003/0145205 | A1 | 7/2003 | Sarcanin |
| 2003/0172028 | A1 | 9/2003 | Abell et al. |
| 2003/0186729 | A1 | 10/2003 | Engstrom et al. |
| 2003/0204845 | A1 | 10/2003 | Sibley et al. |
| 2003/0224831 | A1 | 12/2003 | Engstrom et al. |
| 2004/0064612 | A1 | 4/2004 | Pinto et al. |
| 2004/0070952 | A1* | 4/2004 | Higuchi et al. ............... 361/737 |
| 2004/0073519 | A1 | 4/2004 | Fast |
| 2004/0083275 | A1 | 4/2004 | Strisower |
| 2004/0097256 | A1 | 5/2004 | Kujawski |
| 2004/0127256 | A1 | 7/2004 | Goldthwaite et al. |
| 2004/0203486 | A1 | 10/2004 | Shepherd et al. |
| 2004/0209648 | A1 | 10/2004 | Chen |
| 2004/0209649 | A1 | 10/2004 | Lord |

(56) References Cited

U.S. PATENT DOCUMENTS

| | | | |
|---|---|---|---|
| 2004/0220964 A1 | 11/2004 | Shiftan et al. |
| 2004/0238857 A1 | 12/2004 | Beroz et al. |
| 2004/0256469 A1 | 12/2004 | Faenza et al. |
| 2005/0022002 A1 | 1/2005 | Poisner |
| 2005/0023359 A1 | 2/2005 | Saunders |
| 2005/0027543 A1 | 2/2005 | Labrou et al. |
| 2005/0055549 A1 | 3/2005 | Fischer |
| 2005/0074123 A1 | 4/2005 | Cromer et al. |
| 2005/0090280 A1 | 4/2005 | Nielsen |
| 2005/0114780 A1 | 5/2005 | Turgeman |
| 2005/0119936 A1 | 6/2005 | Buchanan et al. |
| 2005/0173518 A1 | 8/2005 | Takayama |
| 2005/0182710 A1 | 8/2005 | Andersson et al. |
| 2005/0182926 A1 | 8/2005 | Akashika et al. |
| 2005/0197169 A1 | 9/2005 | Son |
| 2005/0212690 A1 | 9/2005 | Nishikawa |
| 2005/0224589 A1 | 10/2005 | Park et al. |
| 2005/0230484 A1 | 10/2005 | Cuellar et al. |
| 2005/0269401 A1 | 12/2005 | Spitzer et al. |
| 2005/0269402 A1 | 12/2005 | Spitzer et al. |
| 2005/0286212 A1 | 12/2005 | Brignone et al. |
| 2006/0008256 A1 | 1/2006 | Khedouri et al. |
| 2006/0056397 A1 | 3/2006 | Aizu et al. |
| 2006/0058064 A1 | 3/2006 | Satou |
| 2006/0074698 A1 | 4/2006 | Bishop et al. |
| 2006/0089123 A1 | 4/2006 | Frank |
| 2006/0091223 A1* | 5/2006 | Zellner et al. ............... 235/492 |
| 2006/0160560 A1 | 7/2006 | Josenhans et al. |
| 2006/0186209 A1 | 8/2006 | Narendra et al. |
| 2006/0208055 A1 | 9/2006 | Finn et al. |
| 2006/0219776 A1 | 10/2006 | Finn |
| 2006/0226217 A1 | 10/2006 | Narendra et al. |
| 2006/0231623 A1 | 10/2006 | Brown et al. |
| 2006/0287004 A1 | 12/2006 | Fuqua |
| 2006/0287964 A1 | 12/2006 | Brown |
| 2006/0291483 A1 | 12/2006 | Sela |
| 2007/0011724 A1 | 1/2007 | Gonzalez et al. |
| 2007/0014407 A1 | 1/2007 | Narendra et al. |
| 2007/0014408 A1 | 1/2007 | Narendra et al. |
| 2007/0016798 A1 | 1/2007 | Narendra et al. |
| 2007/0023532 A1 | 2/2007 | Narendra et al. |
| 2007/0053306 A1 | 3/2007 | Stevens |
| 2007/0057038 A1 | 3/2007 | Gannon |
| 2007/0099592 A1 | 5/2007 | Thome et al. |
| 2007/0113260 A1 | 5/2007 | Pua et al. |
| 2007/0145135 A1 | 6/2007 | Jogand-Coulomb et al. |
| 2007/0145152 A1 | 6/2007 | Jogand-Coulomb et al. |
| 2007/0152035 A1 | 7/2007 | Adams et al. |
| 2007/0155430 A1 | 7/2007 | Cheon et al. |
| 2007/0156436 A1 | 7/2007 | Fisher et al. |
| 2007/0156933 A1 | 7/2007 | Pinto et al. |
| 2007/0170256 A1 | 7/2007 | Breitfuss |
| 2007/0194105 A1 | 8/2007 | Kissick |
| 2007/0206743 A1 | 9/2007 | Chang |
| 2007/0253251 A1 | 11/2007 | Mizushima et al. |
| 2007/0254712 A1 | 11/2007 | Chitti |
| 2007/0255652 A1 | 11/2007 | Tumminaro et al. |
| 2008/0003882 A1 | 1/2008 | Ni et al. |
| 2008/0010372 A1 | 1/2008 | Khedouri et al. |
| 2008/0026752 A1 | 1/2008 | Flore et al. |
| 2008/0051059 A1 | 2/2008 | Fisher |
| 2008/0051122 A1 | 2/2008 | Fisher |
| 2008/0052192 A1 | 2/2008 | Fisher |
| 2008/0052225 A1 | 2/2008 | Walker et al. |
| 2008/0052233 A1 | 2/2008 | Fisher et al. |
| 2008/0054079 A1 | 3/2008 | Mullen |
| 2008/0077950 A1 | 3/2008 | Burke et al. |
| 2008/0090527 A1 | 4/2008 | Atkinson et al. |
| 2008/0092212 A1 | 4/2008 | Patel et al. |
| 2008/0093467 A1 | 4/2008 | Narendra et al. |
| 2008/0099559 A1* | 5/2008 | Lo et al. ............... 235/441 |
| 2008/0144650 A1 | 6/2008 | Boch et al. |
| 2008/0244208 A1 | 10/2008 | Narendra et al. |
| 2008/0263363 A1 | 10/2008 | Jueneman et al. |
| 2008/0263680 A1 | 10/2008 | Bertin |
| 2008/0277484 A1 | 11/2008 | Launay et al. |
| 2008/0279381 A1 | 11/2008 | Narendra et al. |
| 2008/0290160 A1 | 11/2008 | Huot et al. |
| 2008/0305772 A1 | 12/2008 | Balasubramanian et al. |
| 2008/0308641 A1 | 12/2008 | Finn |
| 2009/0002167 A1 | 1/2009 | Mosteller |
| 2009/0006722 A1 | 1/2009 | McAvoy et al. |
| 2009/0015198 A1 | 1/2009 | Brandenburg |
| 2009/0024533 A1 | 1/2009 | Fernandes et al. |
| 2009/0040116 A1 | 2/2009 | Eray |
| 2009/0064045 A1 | 3/2009 | Tremblay |
| 2009/0065571 A1 | 3/2009 | Jain |
| 2009/0065572 A1 | 3/2009 | Jain |
| 2009/0068982 A1 | 3/2009 | Chen et al. |
| 2009/0098825 A1 | 4/2009 | Huomo et al. |
| 2009/0103732 A1 | 4/2009 | Benteo et al. |
| 2009/0108063 A1 | 4/2009 | Jain et al. |
| 2009/0115571 A1 | 5/2009 | Bishop et al. |
| 2009/0127345 A1 | 5/2009 | Chamley et al. |
| 2009/0137152 A1 | 5/2009 | Tanaka et al. |
| 2009/0137204 A1 | 5/2009 | Chang |
| 2009/0143104 A1 | 6/2009 | Loh et al. |
| 2009/0152361 A1 | 6/2009 | Narendra et al. |
| 2009/0169013 A1 | 7/2009 | Fascenda et al. |
| 2009/0177530 A1 | 7/2009 | King et al. |
| 2009/0181735 A1 | 7/2009 | Griffin et al. |
| 2009/0192935 A1 | 7/2009 | Griffin et al. |
| 2009/0193500 A1 | 7/2009 | Griffin et al. |
| 2009/0210569 A1 | 8/2009 | Lusetti et al. |
| 2009/0216681 A1 | 8/2009 | McCown |
| 2009/0224888 A1 | 9/2009 | Caruana |
| 2009/0234760 A1 | 9/2009 | Walter |
| 2009/0235037 A1 | 9/2009 | Mounier et al. |
| 2009/0298540 A1 | 12/2009 | Narendra et al. |
| 2010/0022273 A1 | 1/2010 | Patrice |
| 2010/0107230 A1 | 4/2010 | Tyagi et al. |
| 2010/0114773 A1 | 5/2010 | Skowronek |
| 2010/0136913 A1 | 6/2010 | Picquenot et al. |
| 2010/0162377 A1 | 6/2010 | Gonzalez et al. |
| 2010/0203870 A1 | 8/2010 | Hubinak et al. |
| 2010/0205373 A1 | 8/2010 | He et al. |
| 2010/0213265 A1 | 8/2010 | Narendra et al. |
| 2010/0258639 A1 | 10/2010 | Florek et al. |
| 2010/0262840 A1 | 10/2010 | Benteo et al. |
| 2010/0264211 A1 | 10/2010 | Jain et al. |
| 2010/0274712 A1 | 10/2010 | Mestr et al. |
| 2011/0145049 A1 | 6/2011 | Hertel et al. |
| 2012/0143707 A1 | 6/2012 | Jain |

FOREIGN PATENT DOCUMENTS

| | | |
|---|---|---|
| DE | 103 17 394 | 11/2004 |
| DE | 20 2006 001 690 | 4/2006 |
| EP | 1 111 557 | 6/2001 |
| EP | 1 306 760 | 5/2003 |
| EP | 1 626 349 | 2/2006 |
| EP | 1 770 601 | 4/2007 |
| EP | 1 773 059 | 4/2007 |
| EP | 1 933 259 | 6/2008 |
| JP | 4083447 | 3/1992 |
| JP | 2001-167231 | 6/2001 |
| JP | 3082825 | 1/2002 |
| JP | 2002-328748 | 11/2002 |
| JP | 2006-079592 | 3/2006 |
| JP | 2006-322186 | 11/2006 |
| JP | 2007-116375 | 5/2007 |
| WO | 91/12698 | 8/1991 |
| WO | 99/34314 | 7/1999 |
| WO | 00/28490 | 5/2000 |
| WO | 01/22695 | 3/2001 |
| WO | 01/48688 | 7/2001 |
| WO | 02/11074 | 2/2002 |
| WO | 2005/119607 | 12/2005 |
| WO | 2005/119608 | 12/2005 |
| WO | 2006/086232 | 8/2006 |
| WO | 2006/091709 | 8/2006 |
| WO | 2006/108184 | 10/2006 |
| WO | 2007/011937 | 1/2007 |
| WO | 2007/011990 | 1/2007 |

(56) References Cited

FOREIGN PATENT DOCUMENTS

| WO | 2007/011991 | 1/2007 |
|---|---|---|
| WO | 2007/011992 | 1/2007 |
| WO | 2007/052151 | 5/2007 |
| WO | 2007/088898 | 8/2007 |
| WO | 2007/125223 | 11/2007 |

OTHER PUBLICATIONS

Rankl, W., and Effing, W., Smart Card Handbook, Second Edition, John Wiley & Sons, Ltd., Sep. 18, 2000, 32 pages.
Uren P: "Internet Smartcard Benefits for Internet Security Issues" Campus-Wide Information Systems, Emerald Group Publishing Ltd., Bradford, GB, vol. 20, No. 3, Jan. 1, 2003, pp. 105-114 (XP008078638).
U.S. Appl. No. 60/222,475 entitled "Electronic Device Cover With Embedded Radio Frequency (RF) Transponder and Methods of Using Same", inventor Zalewski, filed on Aug. 2, 2000; 46 pages.
Office Action issued in U.S. Appl. No. 12/205,796 on Dec. 1, 2011; 13 pages.
Office Action issued in U.S. Appl. No. 12/205,807 on Feb. 23, 2011; 15 pages.
Office Action issued in U.S. Appl. No. 12/205,807 on Jul. 14, 2011; 16 pages.
Advisory Action issued in U.S. Appl. No. 12/205,807 on Sep. 26, 2011; 3 pages.
Office Action issued in U.S. Appl. No. 12/205,814 on Sep. 15, 2011; 20 pages.
Office Action issued in U.S. Appl. No. 12/205,821 on Oct. 13, 2010; 15 pages.
Office Action issued in U.S. Appl. No. 12/205,821 on Apr. 1, 2011; 15 pages.
Office Action issued in U.S. Appl. No. 12/205,821 on Jun. 15, 2011; 15 pages.
Notice of Allowance issued in U.S. Appl. No. 12/205,821 on Dec. 19, 2011; 11 pages.
Office Action issued in U.S. Appl. No. 12/206,564 on Nov. 23, 2010; 15 pages.
Notice of Allowance issued in U.S. Appl. No. 12/206,564 on Mar. 30, 2011; 8 pages.
Notice of Allowance issued in U.S. Appl. No. 12/209,810 on Feb. 2, 2011; 8 pages.
Notice of Allowance issued in U.S. Appl. No. 13/074,744 on Dec. 14, 2011; 10 pages.
Office Action issued in U.S. Appl. No. 12/209,950 on Jan. 12, 2012; 30 pages.
Office Action issued in U.S. Appl. No. 12/210,167 on Dec. 16, 2011; 15 pages.
Office Action issued in U.S. Appl. No. 12/209,087 on Nov. 4, 2009; 42 pages.
Office Action issued in U.S. Appl. No. 12/209,087 on Jul. 7, 2010; 36 pages.
Office Action issued in U.S. Appl. No. 12/210,161 on Sep. 2, 2011; 10 pages.
Office Action issued in U.S. Appl. No. 12/210,161 on Dec. 20, 2011; 14 pages.
Office Action issued in U.S. Appl. No. 12/210,176 on Nov. 2, 2011; 21 pages.
Office Action issued in U.S. Appl. No. 12/272,527 on Mar. 16, 2011; 8 pages.
Office Action issued in U.S. Appl. No. 12/272,527 on Sep. 9, 2011; 8 pages.
Office Action issued in U.S. Appl. No. 12/568,592 on Jun. 27, 2011; 11 pages.
Notice of Allowance issued in U.S. Appl. No. 12/568,592 on Sep. 30, 2011; 7 pages.
Office Action issued in U.S. Appl. No. 12/571,163 on Jun. 16, 2011; 10 pages.
Office Action issued in U.S. Appl. No. 12/571,163 on Nov. 9, 2011; 9 pages.
Notification of Transmittal of the International Search Report and the Written Opinion of the International Searching Authority issued in International Application No. PCT/US2008/075977 on Dec. 29, 2008; 12 pages.
International Preliminary Report on Patentability issued in international Application No. PCT/US2008/075977 on Dec. 30, 2009; 6 pages.
Notification of Transmittal of the International Search Report and the Written Opinion of the International Searching Authority issued in International Application No. PCT/US2008/076006 on Dec. 16, 2008; 13 pages.
International Preliminary Report on Patentability issued in International Application No. PCT/US2008/076006 on Dec. 29, 2009; 11 pages.
Notification of Transmittal of the International Search Report and the Written Opinion of the International Searching Authority issued in International Application No. PCT/US2008/076033 on Jan. 5, 2009; 12 pages.
International Preliminary Report on Patentability issued in International Application No. PCT/US2008/076033 on Dec. 29, 2009; 7 pages.
International Search Report and Written Opinion of the International Searching Authority issued in International Application No. PCT/US2008/076046 on Jan. 8, 2010; 14 pages.
International Preliminary Report on Patentability issued in International Application No. PCT/US2008/076046 on Mar. 16, 2010; 8 pages.
International Preliminary Report on Patentability issued in International Application No. PCT/US2008/076046 on May 21, 2010; 13 pages.
Notification of Transmittal of the International Search Report and the Written Opinion of the International Searching Authority issued in International Application No. PCT/US2008/076275 on Apr. 16, 2009; 15 pages.
International Preliminary Report on Patentability issued in International Application No. PCT/US2008/076275 on Dec. 10, 2009; 14 pages.
International Search Report and Written Opinion issued in International Application No. PCT/US2008/076307 on May 26, 2009; 15 pages.
Notification of Transmittal of the International Search Report and the Written Opinion of the International Searching Authority issued in International Application No. PCT/US2008/076318 on Feb. 2, 2009; 14 pages.
International Preliminary Report on Patentability issued in International Application No. PCT/US2008/076318 on Sep. 11, 2009; 12 pages.
Notification of Transmittal of the International Search Report and the Written Opinion of the International Searching Authority issued in International Application No. PCT/US2008/076158 on Dec. 11, 2008; 14 pages.
International Preliminary Report on Patentability issued in International Application No. PCT/US2008/076158 on Dec. 29, 2009; 13 pages.
Notification of Transmittal of the International Search Report and the Written Opinion of the International Searching Authority issued in International Application No. PCT/US2008/076316 on Jan. 13, 2009; 14 pages.
International Preliminary Report on Patentability issued in international Application No. PCT/US2008/076316 on Nov. 27, 2009; 19 pages.
Notification of Transmittal of the International Search Report and the Written Opinion of the International Searching Authority issued in International Application No. PCT/US2008/076319 on Jan. 14, 2009; 15 pages.
International Preliminary Report on Patentability issued in International Application No. PCT/US2008/076319 on Dec. 16, 2009; 12 pages.
International Search Report and Written Opinion issued in International Application No. PCT/US2009/061032 on Mar. 30, 2010; 14 pages.

(56) References Cited

OTHER PUBLICATIONS

International Preliminary Report on Patentability issued in International Application No. PCT/US2009/061018 on Sep. 26, 2011; 6 pages.
International Search Report and Written Opinion issued in International Application No. PCT/US2009/061018 on Mar. 1, 2010; 14 pages.
International Preliminary Report on Patentability issued in International Application No. PCT/US2009/061032 on Jan. 18, 2012; 17 pages.
International Search Report and Written Opinion of the International Searching Authority issued in International Application No. PCT/US2011/035548 on Dec. 14, 2011; 8 pages.
Office Action issued in Chinese Application No. 200880107195.2 on Sep. 7, 2011; 13 pages.
Office Action issued in Chinese Application No. 200880107013.1 on Sep. 28, 2011; 8 pages.
Communication Pursuant to Article 94(3) EPC issued in European Application No. 08830698.0 on Nov. 29, 2010; 5 pages.
Communication Pursuant to Article 94(3) EPC issued in EP Application No. 08 830 698.0, dated Sep. 12, 2011, 4 pages.
Communication under Rule 71(3) issued in European Application No. 08830004.1 on Dec. 22, 2010; 70 pages.
Communication Pursuant to Article 94(3) EPC issued in European Application No. 08830136.1 on Nov. 29, 2010; 3 pages.
Office Action issued in Mexican Application No. MX/a/2010/002838 on Oct. 28, 2011; 2 pages.
Office Action issued in Mexican Application No. MX/a/2010/002833 on Jul. 14, 2011; 2 pages.
U.S. Appl. No. 12/205,796, entitled "Wirelessly Executing Financial Transactions", inventor Jain, filed Sep. 5, 2009.
U.S. Appl. No. 12/205,807, entitled "Interfacign Transaction Cards With Host Devices", inventor Jain, filed Sep. 5, 2008.
U.S. Appl. No. 12/205,814, entitled "Presenting Web Pages Through Mobile Host Devices", inventor Jain, filed Sep. 5, 2009.
U.S. Appl. No. 12/205,821, entitled "Selectively Switching Antennas of Transaction Cards", inventor Jain, filed Sep. 5, 2008.
U.S. Appl. No. 12/206,564,entitled "Wirelessly Executing Transactions With Different Enterprises", inventor Jain, filed Sep. 8, 2008.
U.S. Appl. No. 12/209,810, entitled "Updating Mobile Devices With Additional Elements", inventors Jain et al., filed Sep. 12, 2008.
U.S. Appl. No. 12/678,052 entitled "Updating Mobile Devices with Additional Elements", inventors Jain et al., filed Mar. 12, 2010.
U.S. Appl. No. 12/209,950, entitled "Wirelessly Accessing Broadband Services Using Intelligent Cards", inventor Jain, filed Sep. 12, 2008.
U.S. Appl. No. 12/210,167, entitled "Wirelessly Receiving Broadcast Signals Using Intelligent Cards", inventor Jain, filed Sep. 12, 2008.
U.S. Appl. No. 12/209,087, entitled "Wirelessly Executing Financial Transactions", inventor Jain, filed Sep. 11, 2008.
U.S. Appl. No. 12/210,161, entitled "Wirelessly Accessing Broadband Services Using Intelligent Covers", inventors Jain, et al., filed Sep. 12, 2008.
U.S. Appl. No. 12/678,047 entitled "Wirelessly Accessing Broadband Services Using Intelligent Covers", inventors Jain et al., filed Mar. 12, 2010.
U.S. Appl. No. 12/210,176, entitled "Receiving Broadcast Signals Using Intelligent Covers for Mobile Devices", inventors Jain, et al., filed Sep. 12, 2008.
U.S. Appl. No. 12/678,085 entitled "Receiving Broadcast Signals Using Intelligent Covers for Mobile Devices", inventors Jain et al., filed Mar. 12, 2010.
U.S. Appl. No. 12/272,527, entitled "Wirelessly Communicating Radio Frequency Signals", inventors Jain, et al., filed Nov. 17, 2008.
U.S. Appl. No. 12/571,163, entitled "Amplifying Radio Frequency Signals", inventor Jain, filed Sep. 30, 2008.
U.S. Appl. No. 12/776,285 entitled "Magnetically Coupling Radio Frequency Antennas", inventor Jain, filed May 7, 2010.

Herzberg, Amir "Payments and Banking with Mobile Personal Devices", Communications of the ACM, May 2003; vol. 46, No. 6; pp. 53-58.
Notice of Allowance issued in U.S. Appl. No. 12/205,796 Aug. 20, 2012 issued on Jul. 2, 2012; 10 pages.
Office Action issued in U.S. Appl. No. 12/205,807 on Jun. 7, 2012; 14 pages.
Office Action issued in U.S. Appl. No. 12/205,814 on Feb. 28, 2012; 23 pages.
Office Action issued in U.S. Appl. No. 13/367,022 on Mar. 13, 2012; 15 pages.
Notice of Allowance issued in U.S. Appl. No. 13/367,022 on Oct. 24, 2012; 9 pages.
Office Action issued in U.S. Appl. No. 13/108,717 on Oct. 5, 2011; 18 pages.
Office Action issued in U.S. Appl. No. 13/108,717 on Feb. 9, 2012; 19 pages.
Office Action issued in U.S. Appl. No. 13/108,717 on May 1, 2012; 20 pages.
Office Action issued in U.S. Appl. No. 13/108,717 on Sep. 6, 2012; 6 pages.
Notice of Allowance issued in U.S. Appl. No. 13/108,717 on Nov. 27, 2012; 7 pages.
Office Action issued in U.S. Appl. No. 12/209,950 on Jun. 21, 2012; 34 pages.
Office Action issued in U.S. Appl. No. 12/210,167 on Jul. 19, 2012; 16 pages.
Office Action issued in U.S. Appl. No. 12/210,167 on Nov. 16, 2012; 18 pages.
Notice of Allowance issued in U.S. Appl. No. 12/210,161 on Mar. 2, 2012; 10 pages.
Office Action issued in U.S. Appl. No. 13/481,690 on Jun. 26, 2012; 31 pages.
Notice of Allowance issued in U.S. Appl. No. 13/481,690 on Nov. 6, 2012; 25 pages.
Office Action issued in U.S. Appl. No. 12/210,176 on Apr. 5, 2012; 19 pages.
Office Action issued in U.S. Appl. No. 12/210,176 on Nov. 14, 2012, 27 pages.
Office Action issued in U.S. Appl. No. 13/302,766 on May 29, 2012; 9 pages.
Office Action issued in U.S. Appl. No. 13/302,766 on Oct. 16, 2012; 10 pages.
Office Action issued in U.S. Appl. No. 12/776,285 on Mar. 23, 2012; 14 pages.
Examination report issued in Australian Application No. 2008298581 on Oct. 4, 2012; 3 pages.
Examination report issued in Australian Application No. 2008298677 on Jun. 6, 2012; 2 pages.
Office Action issued in Chinese Application No. 200880107195.2 on May 29, 2012; 10 pages.
Notice of Allowance issued in Chinese Application No. 200880107195.2 on Nov. 23, 2012; 7 pages.
Office Action issued in Chinese Application No. 200880107187.8 on Apr. 28, 2012; 10 pages.
Notice of Allowance issued in Chinese Application No. 200880107013.1 on Apr. 28, 2012; 4 pages.
Communication under Rule 71(3) issued in European Application No. 08830136.1 on Sep. 30, 2011; 67 pages.
International Preliminary Report on Patentability issued in International Application No. PCT/US11/35548, mailed Dec. 20, 2012, 7 pages.
Office Action issued in U.S. Appl. No. 12/205,807 on Jan. 16, 2013, 19 pages.
Office Action issued in U.S. Appl. No. 13/078,744 on Jan. 23, 2013, 14 pages.
Notice of Allowance issued in U.S. Appl. No. 13/078,744 issued May 15, 2013.
Office Action issued in U.S. Appl. No. 12/678,052 issued on May 3, 2013; 18 pages.
Office Action issued in U.S. Appl. No. 12/209,950 on Feb. 1, 2013, 41 pages.

(56) References Cited

OTHER PUBLICATIONS

Office Action issued in U.S. Appl. No. 12/209,950 on Dec. 10, 2013, 29 pages.
Office Action issued in U.S. Appl. No. 12/210,176 on Apr. 4, 2013; 21 pages.
Notice of Allowance issued in U.S. Appl. No. 13/302,766 on Jan. 23, 2013, 7 pages.
Office Action issued in U.S. Appl. No. 12/776,285 on May 1, 2013, 9 pages.
Office Action issued in U.S. Appl. No. 12/205,814 issued on Jun. 27, 2013, 22 pages.
Office action issued in U.S. Appl. No. 13/499,579 on Jul. 12, 2013, 15 pages.
Office action issued in U.S. Appl. No. 13/499,579 on Oct. 28, 2013, 10 pages.
Office action issued in U.S. Appl. No. 12/678,085 on Jul. 8, 2013, 21 pages.
Office action issued in U.S. Appl. No. 12/210,176 on Jul. 12, 2013, 23 pages.
Office Action issued in U.S. Appl. No. 13/313,866 on Mar. 29, 2013, 7 pages.
Office Action for U.S. Appl. No. 13/774,871 issued on Aug. 27, 2013, 15 pages.
Office Action issued in U.S. Appl. No. 12/776,285 on Sep. 12, 2013, 12 pages.
Office Action issued in U.S. Appl. No. 13/313,866 on Aug. 8, 2013, 9 pages.
Examination Report issued in Australian Application No. 2008298886 on Jan. 15, 2013; 3 pages.
Notice of Acceptance issued in Australian Application No. 2008298886 on Oct. 29, 2013; 7 pages.
Notice of Acceptance issued in Australian Application No. 2008298581 on Jul. 9, 2013; 2 pages.
Notice of Allowance issued in Australian Application No. 2008298677 on Feb. 25, 2013, 2 pages.
Office Action issued in Canadian Application No. 2,698,684 on Jul. 16, 2013; 2 pages.
Notice of Allowance issued in Chinese Application No. 200880107187.8 on Jun. 9, 2013; 4 pages.
Communication under Rule 71(3) EPC issued in EP Application No. 08 830 698.0, dated Feb. 6, 2012, 78 pages.
Office Action issued in U.S. Appl. No. 13/872,931 on Nov. 19, 2013; 20 pages.
Office Action issued in U.S. Appl. No. 13/769,124 on Dec. 18, 2013; 31 pages.
Substantive Examination Adverse Report issued in Malaysian Application No. PI 2010000978 on Dec. 13, 2013; 3 pages.
Notice of allowance issued in U.S. Appl. No. 12/209,950 on Feb. 28, 2014, 8 pages.
Substantive Examination Adverse Report issued in Malaysian Application No. PI 2010000887 on Nov. 15, 2013; 4 pages.
Office Action issued in Chinese Application No. 200980162753.X on Jun. 4, 2014; 17 pages.

* cited by examiner

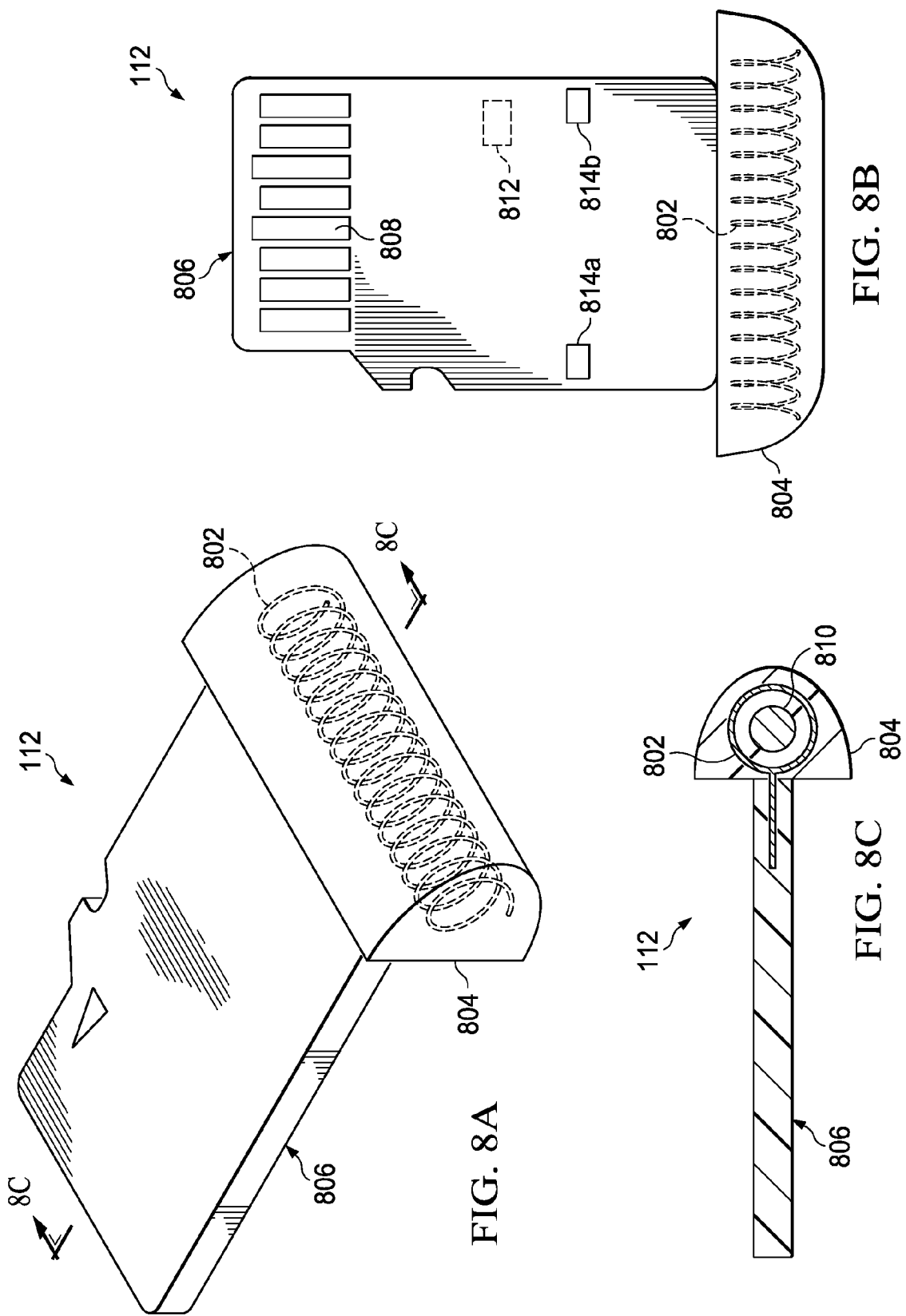

SWITCHING BETWEEN INTERNAL AND EXTERNAL ANTENNAS

CLAIM OF PRIORITY

This application is a divisional of and claims priority to U.S. patent application Ser. No. 12/568,592, filed Sep. 28, 2009, which is a continuation-in-part of and claims priority to U.S. patent application Ser. No. 12/272,527, filed Nov. 17, 2008, which is a continuation-in-part of and claims priority to U.S. patent application Ser. No. 12/209,087, filed Sep. 11, 2008, which claims priority under 35 U.S.C. §119(e) to U.S. Provisional Application No. 60/971,813, filed on Sep. 12, 2007, the entire contents of each of the above-identified cases are hereby incorporated by reference.

TECHNICAL FIELD

This invention relates to network communications and, more particularly, to switching between internal and external antennas.

BACKGROUND

Portable electronic devices and tokens have become an integrated part of the regular day to day user experience. There is a wide variety of common portable and handheld devices that users have in their possession including communication, business and entertaining devices such as cell phones, music players, digital cameras, smart cards, memory token and variety of possible combinations of the aforementioned devices and tokens. All of these devices share the commonality that consumer are accustomed to carrying them with them most of the time and to most places. This is true across the various demographics and age groups regardless of the level of the sophistication of the consumer, their age group, their technical level or background.

These common handheld devices offer options for expandable memory. Micro Secure Digital (microSD) is the popular interface across high-end cellphones while SD and MultiMediaCard (MMC) interfaces are also available in limited models. MicroSD is the least common denominator supported by the majority of these devices and tokens (in terms of size). In addition, adaptors are available to convert a MicroSD into MiniSD, SD, MMC and USB Although most popular MP3 player (iPOD) offer's a proprietary interface, competing designs do offer standard interfaces. Digital cameras offer mostly SD and MMC while extreme Digital (xD) is another option. Micro and Mini versions of these interfaces are also available in several models. Mini-USB is increasingly available across cellphones, digital cameras and MP3 players for synchronization with laptops.

SUMMARY

The present disclosure is directed to a system and method for switching between internal and external antennas. n some implementations, a system includes an antenna, a connector, and a housing. The antenna is configured to communicate wirelessly transactions with transaction terminals. The connector is connected to the antenna and configured to connect a transaction card to the antenna in response to at least insertion in the housing. The housing enclosing at least a portion of the antenna and at least a portion of the connector and including one or more elements that form an opening for receiving the transaction card. In addition, the housing is substantially rectangular and includes a first portion with a first thickness and a second portion with a second thickness different from the first thickness and at least the thickness of the transaction card. In some instances, the housing may provide additional communication methods such as a smart card contact and/or magnetic stripe to make contact transactions with transaction terminals.

The details of one or more embodiments of the invention are set forth in the accompanying drawings and the description below. Other features, objects, and advantages of the invention will be apparent from the description and drawings, and from the claims.

DESCRIPTION OF DRAWINGS

FIGS. 8A-8C illustrate another example of antenna design;

Like reference symbols in the various drawings indicate like elements.

DETAILED DESCRIPTION

Figure 1:
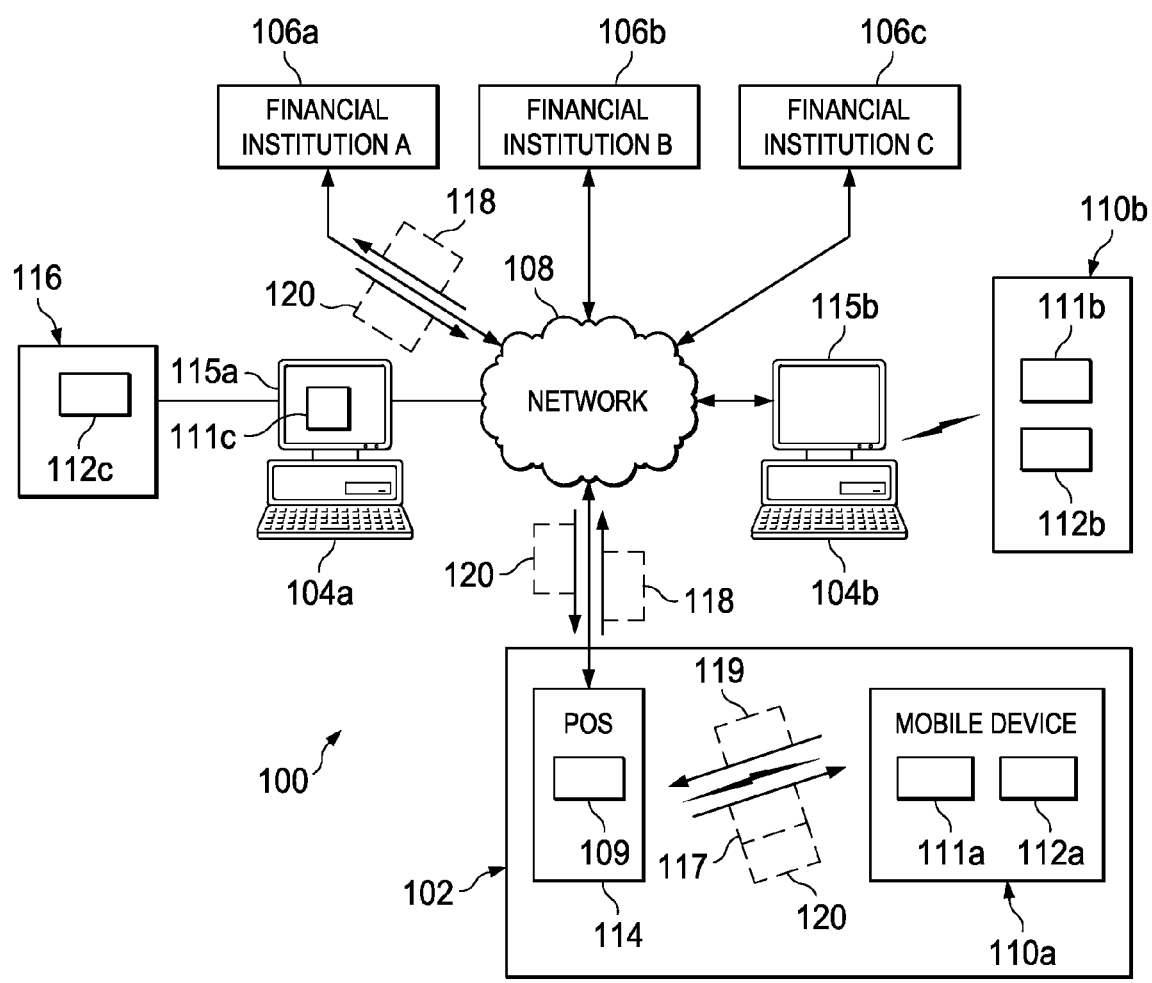
FIG. 1 is an example transaction system in accordance with some implementations of the present disclosure.

FIG. 1 is a block diagram illustrating an example transaction system 100 for wirelessly executing transactions using an intelligent card independent of a host device. For example, the system 100 may include a micoSecure Digital (microSD) card that executes transactions with financial institutions independent of a host device. Aside from microSD, the system 100 may include other mass storage interfaces that connect an intelligent card to the host device such as, for example, MultiMediaCard (MMC), SD, Universal Serial Bus (USB), Apple iDock, Firewire, and/or others. An intelligent card is a device configured to insert into or otherwise attach to a host device and access or otherwise execute services (e.g., transactions) independent of the host device. In some implementations, the intelligent card may be shaped as a microSD card including, for example, notches, raised portions and/or other features. The system 100 may include an intelligent card that includes a dual interface. The dual interface may connect the intelligent card to both the host device through a physical interface (e.g., SD, MMC, USB) and external devices through a wireless connection (e.g., NFC, ISO 14443). In some implementations, the intelligent card may include an embedded secure chip, Central Processing Unit (CPU) with operating system, local memory and value added applications accessible by the user through the host device. A host device may include a cellphone, a smartphone, a Personal Digital Assistant (PDA), a MPEG-1 Audio Layer 3 (MP3) device, a digital camera, a camcorder, a client, a computer, and/or other device that includes a mass memory and/or peripheral interface. In some implementations, the intelligent card can operate as a master with the host device being a slave such that the intelligent card controls operational aspects of the host device such as a user interface. The intelligent card in the system 100 may execute one or more of the following: selectively activate an antenna for wireless transactions in response to at least an event; verify the host device with a financial institution through, for example, a Point Of Sale (POS) using a host signature; execute a transaction with a financial institution through, for example, a POS terminal independent of the host device; and/or other processes. By providing an intelligent card, the system 100 may wirelessly execute transactions with financial institutions without either requiring additional hardware, software, and/or firmware on the host device and/or without requiring changes to existing hardware, software, and/or firmware for reader terminals to enable a user to wirelessly execute a transaction.

At a high level, the system 100 includes an offline store 102 and clients 104a and 104b coupled to financial institutions 106 through a network 108. While not illustrated, the system 100 may included several intermediary parties between the financial institution 106 and the network such as, for example, a transaction acquirer and/or a payment network host. The offline store 102 includes a mobile device 110a having a transaction card 112a and a Point of Sale (POS) device 114 that executes transactions with customers. The POS device 114 includes a Graphical User Interface (GUI) 109 for presenting information to and/or receiving information from users. In some implementations, the POS 114 may transmit a request to execute a transaction to the transaction card 112. The transaction card 112 may transmit authentication information to the POS 114. The client 104 includes the GUI 115 for presenting information associated with the system 100. The client 104a includes a card reader 116 that interfaces the transaction card 112c with the client 104a. The financial institution 106 may authorize the transaction based, at least in part, on information transmitted by the transaction card 112. The mobile device 110 includes a GUI 111 for presenting information associated with financial transactions.

The offline store 102 is generally at least a portion of an enterprise having a physical presence (e.g., building) for operations. For example, the offline store 102 may sell goods and/or services at a physical location (e.g., a brick-and-mortar store) directly to customers. In this example, the offline store 102 buys or otherwise receives goods (e.g., produce) from distributors (not illustrated) and then may sell these goods to customers, such as users of the mobile device 110. In general, the offline store 102 may offer face-to-face experiences with customers in providing goods and/or services. For example, the offline store 102 may be a click-and-mortar store such that a user selects a good or service using the Internet and purchases and receives the good or service at the offline store 102. The offline store 102 may provide one or more of the following services associated with goods: inventory, warehousing, distribution, and/or transportation. As a result, the offline store 102 may not immediately distribute goods received from distributors. The offline store 102 may include a single retail facility, one or more retail facilities at a single geographic location, and/or a plurality of retail facilities geographically distributed. In some cases, two or more entities may represent portions of the same legal entity or affiliates. For example, the offline store 102 and distributors may be departments within one enterprise. In summary, the offline store 102 may wirelessly execute financial transactions with the mobile device 110.

Each mobile device 110 comprises an electronic device operable to interface with the transaction card 112a. For example, the mobile device 110 may receive and transmit wireless and/or contactless communication with the system 100. As used in this disclosure, the mobile devices 110 are intended to encompass cellular phones, data phones, pagers, portable computers, SIP phones, smart phones, personal data assistants (PDAs), digital cameras, MP3 players, camcorders, one or more processors within these or other devices, or any other suitable processing devices capable of communicating information with the transaction card 112. In some implementations, the mobile devices 110 may be based on a cellular radio technology. For example, the mobile device 110 may be a PDA operable to wirelessly connect with an external or unsecured network. In another example, the mobile device 110 may comprise a smartphone that includes an input device, such as a keypad, touch screen, mouse, or other device that can accept information, and an output device that conveys information associated with a transaction with the offline store 102, including digital data, visual information, or GUI 111.

The GUI 111 comprises a graphical user interface operable to allow the user of the mobile device 110 to interface with at least a portion of the system 100 for any suitable purpose, such as authorizing transactions and/or displaying transaction history. Generally, the GUI 111 provides the particular user with an efficient and user-friendly presentation of data provided by or communicated within the system 100 and/or also an efficient and user-friendly means for the user to self-manage settings and access services offered by the financial institution 106. The GUI 111 may comprise a plurality of customizable frames or views having interactive fields, pull-down lists, and/or buttons operated by the user. The term graphical user interface may be used in the singular or in the plural to describe one or more graphical user interfaces and each of the displays of a particular graphical user interface. The GUI 111 can include any graphical user interface, such as a generic web browser or touch screen, that processes information in the system 100 and presents the results to the user.

The transaction card 112 can include any software, hardware, and/or firmware configured to wirelessly execute transactions with the POS device 114. For example, the transaction card 112 may execute a contactless transaction with the POS device 114 independent of the mobile device 110a. In other words, the transaction card 112 may wirelessly execute transactions without aspects of the transaction being executed by the mobile device 110. The transaction card 112 may execute transactions with the POS device 114 using short range signals such as NFC (e.g., ISO 18092/ECMA 340), ISO 14443 type A/B, ISO 15693, Felica, MiFARE, Bluetooth, Ultra-wideband (UWB), Radio Frequency Identifier (RFID), contactless signals, proximity signals, and/or other signals compatible with retail payment terminals (e.g., POS 114). In some implementations, the transaction card 112 may include one or more chipsets that execute an operating system and security processes to independently execute the transaction. In doing so, the mobile device 110 does not require additional hardware, software, and/or firmware to wirelessly execution a transaction with the POS 114 such as an NFC transaction. In some implementations, the transaction card 112 may execute one or more of the following: wirelessly receive a request from the POS device 114 to execute a transaction and/or and provide a response; translate between wireless protocols and protocols compatible with the transaction card 112; translate between transaction-card protocols and protocols compatible with mobile device 110; present and receive information (e.g., PIN request, PIN) from the user through the GUI 111; decrypt and encrypt information wirelessly transmitted between the transaction card 112 and the POS 114; execute applications locally stored in the transaction card 112; selectively switch the antenna of the transaction card 112 on and off based, at least in part, on one or more events; execute authentication processes based, at least in part, on information received, for example, through the GUI 111; transmit a host signature to POS 114 in response to at least a transaction challenge; store, at least in part, details of the transaction executed between place between the card 112 and the POS device 114; generate and/or present alerts (e.g., audio-visual alerts) to the user through the GUI 111; generate and/or transmit wireless-message alerts to the financial institution 106 using the mobile device 110 if cellular capable; and/or others. In some implementations, the transaction card 112 may include a communication module with of a protocol translation module, antenna tuning circuit, power circuit and a miniature antenna tuned to exchange wireless data with a retail terminal 114.

In some implementations, the transaction card 112 may initiate a transaction in response to at least a user selecting a graphical element in the GUI 111. The transaction card 112 may initiate a transaction with the POS 114 in response to at least wireless request transmitted by the POS 114. In some implementations, the transaction card 112 may selectively switch the antenna between an on and off state in response to one or more events. The one or more events may include a user request, completion of transaction, insertion of card 112 in a different mobile device, location change, timer events, detection of incorrect PIN entered by the user, change of wireless network that the device is connected to, message received from the financial institution 106 using wireless communication methods such as SMS, and/or other events. For example, the transaction card 112 may receive one or more commands to switch the antenna off from a cellular network (not illustrated) through the mobile device 110. In some implementations, the transaction card 112 may request user identification such as a PIN, a user ID and password combination, biometric signature, and/or others.

In regards to translating between protocols, the transaction card 112 may process information in, for example, ISO 7816, a standard security protocol, and/or others. In this case, the transaction card 112 may translate between an NFC protocol (e.g., ISO 18092) and the transaction-card protocol. In some implementations, ISO 7816 commands may be encapsulated within interface commands used to transmit data between the host device 114 and the card 112. In addition, the transaction card 112 may interface the mobile device 110 through a physical interface such as MicroSD, Mini-SD SD, MMC, miniMMC, microMMC, USB, miniUSB, microUSB, firewire, Apple iDock, and/or others. In regard to security processes, the transaction card 112 may implement one or more encryption algorithms to secure transaction information such as card number (e.g., credit card number, debit-card number, bank account number), PIN, and/or other security related information. The security related information may include an expiry date, card verification code, user name, home phone number, user zip code and/or other user information associated with verifying an identity of the card holder. In some implementations, the transaction card 112 may execute private key (symmetric algorithms) such as DES, TDES and/or others or public key (asymmetric algorithms) such as RSA, elliptic curves, and/or others. In addition, the transaction card 112 may include memory (e.g., Flash, EEPROM) for storing user data, applications, offline Webpages, and/or other information. In regards to applications, the transaction card 112 may execute a locally stored application and present information to and received information from the user through the GUI 111. For example, the transaction card 112 may execute an application used to synchronize an account balance with the financial institution 106 using the GUI 111 and the mobile device 110. Alternatively or in addition to applications, the transaction card 112 may present offline Web pages to the user using the GUI 111. In response to initiating a transaction, the transaction card 112 may automatically present an offline Web page through the GUI 111. In some implementations, the offline Web page can be associated with a financial institution 106. In some implementations, the transaction card 112 can be backward compatible and operate as a mass storage device. For example, if the wireless interface of the transaction card 112 is not available or deactivated, the transaction card 112 may operate as a mass storage device enabling users to access data stored in the memory component (e.g., Flash). In some implementations, the transaction card 112 can execute a set of initialization commands in response to at least insertion into the mobile device 110. These initialization commands may include determining device related information for the mobile device 100 (e.g., phone number, signature, connected network information, location information and other available properties), determining user relating information (e.g., PIN code, activation code), incrementing counters, setting flags and activating/deactivating functions according to pre-existing rules and/or algorithms.

In some implementations, the transaction card 112 may automatically execute one or more fraud control processes. For example, the transaction card 112 may identify an operational change and automatically transmit a notification to the financial institution based, at least in part, on the identified change. The transaction card 112 may execute two fraud control processes: (1) determine a violation of one or more rules; and (2) automatically execute one or more actions in response to at least the violation. In regards to rules, the transaction card 112 may locally store rules associated with updates to operational aspects of the transaction card 112. For example, the transaction card 112 may store a rule indicating a change in mobile host device 110 is an operational violation. In some implementations, the transaction card 112 may store rules based, at least in part, on updates to one or more of the following: phone number of host device 110; MAC address of host device 110; network wirelessly connected to host device 110; location of host device; and/or other aspects. In response to one or more events matching or otherwise violating rules, the transaction card 112 may execute one or more processes to substantially prevent or otherwise notify the financial institutions 106 of potentially fraudulent activity. For example, the transaction card 112 may execute a command to block an associated user account and/or the transaction card 112. Alternatively or in addition, the transaction card 112 may transmit a command to the financial institution 106 to call the mobile host device 110. In some implementations, the transaction card 112 may execute a command based, at least in part, on an event type. In some examples, the transaction card 112 may initiate a call with the financial institution 106 in response to at least a change in number of the host device 110. In some examples, the transaction card 112 may re-execute an activation process in response to at least a specified event type. An activation process may include activating the transaction card and/or financial account as discussed in more detail with respect to FIG. 9. In some implementations, the transaction card 112 may execute a command to disconnect the GUI 111 from the transaction card 112. The transaction card 112 may present a disconnection notification through the GUI 111 prior to executing the command. In some implementations, the transaction card 112 may transmit a command to the financial institution 106 to deactivate an account associated with the card 112.

In some implementations, the POS 114 may transmit a transaction request 117 to the transaction card 112 for information to generate an authorization request 118. In response to at least the transaction request, the transaction card 112 may transmit one or more transaction responses 119 identifying information associated with a payment account. In some implementations, the POS device 114 may transmit a request 118 to authorize a transaction to the financial institution 106. The authorization information may include an account number, a transaction amount, user credentials, and/or other information. In response to at least the transaction request 118, the financial institution 106 may transmit an authorization response 120 to the POS device 114. In some implementations, the POS device 114 may transmit the response 120 to the transaction card 112. The transaction response 120 may include, for example, a receipt presentable to the user through the GUI 111a. In some implementations, the financial institution 106 may transmit the authorization response 120 to the mobile device through a cellular core network (see FIG. 2). In this implementation, the financial institution 106 may have stored the association between the mobile device 110 and the transaction card 112 during the user sign-up process, automatically upon user activation of the card 112 when, for example, the card 112 is initially inserted into the mobile device 110, and/or other event. In the illustrated implementation, the POS 114 includes the GUI 109.

The GUI 109 comprises a graphical user interface operable to allow the user of the POS 114 to interface with at least a portion of the system 100 for any suitable purpose, such as a user entering transaction information (e.g., PIN, transaction acceptance) and/or and presenting transaction information (e.g., transaction amount). Generally, the GUI 109 provides the particular user with an efficient and user-friendly presentation of data provided by or communicated within the system 100 and/or also an efficient and user-friendly means for the user to initiate a wirelessly transaction with the transaction card 112. The GUI 109 may present a series of screens or displays to the user to, for example, accept a transaction and enter security information such as a PIN.

In some implementations, the transaction card 112 can be implemented differently. The transaction card 112 may be implemented as a KeyFOB and remains live outside the mobile device 110 as a FOB. In this case, the transaction card 112 may be passive and powered from an induction magnetic field generated by the POS 114. The transaction card 112 may be implemented in the form of an industrial integrated circuit chip for mounting on a PCB or IC chip. In some implementations, the transaction card 112 may be implemented in the form of a self contained desktop standalone unit powered by external AC adapter or stand alone box. In some implementations, the transaction card 112 can be implemented as an external attachment to a mobile device 110 (e.g., case) and connected to the mobile device using a peripheral interface such as USB, serial port, the iDock apple proprietary interface, and/or other interface.

In some implementations, the transaction card 112 may operate in accordance with one or more of the following modes: active card emulation; active reader; self train; killed; memory; inactive; and/or other modes. The transaction card 112 may operate active-card-emulation mode to convert the mobile device 110 to a contactless payment device loaded with a financial vehicle (FV) that may be, for example, a credit card, a debit card, a gift card and/or other retail payment product. In this mode, the transaction card 112 may execute payment transactions at any capable retail payment terminal (e.g., POS 114) that accepts contactless payment transactions. For example, such terminals may be contactless-enabled terminals currently being deployed by merchants under MasterCard's paypass, Visa's paywave programs, Amex ExpressPay, Discover Zip, and/or other payment programs. After the antenna of the transaction card 112 is activated in this mode, a merchant terminal may detect the presence of a host device with the transaction card 112 and prompt the user to authorize a transaction such as by entering a PIN, signing on a terminal interface, confirming the amount of the transaction, and/or other action. In this mode, such transactions may be handled as a normal card-present transaction. In other words, the POS 114 may perceive the transaction card 112 as a contactless plastic payment card and may communicate with the transaction card 112 as a contactless plastic payment card to execute payment transactions. In these implementations when the card 112 operates in an active-card emulation mode, the POS 114 can wirelessly communicate with the transaction card 112 using the same signals used to communicate with a contactless plastic payment card. In this active-card emulation mode, the transaction card 112 emulates a contactless plastic payment card and may be backward compatible with the POS 114. In this implementation, neither the terminal nor the financial institution may require additional software to execute the transaction. In addition, the transaction card 112 in this mode may be used for other applications such as physical access control (to open gates either in a corporate environment or in a transit environment), logical access control (to request network access via a PC), application access control (to buy access for amenities such as transportation, movies or wherever payment needs to be made to gain access to a facility), and/or other applications.

In the active-reader mode, the transaction card 112 may convert the mobile device 110 to a contactless reader device capable of receiving data when in range of a transmitting terminal (e.g., POS 114). In some implementations, this mode can require special NFC hardware with reader mode capability as part of the transaction card 112. In the event that the mobile device 110 is proximate (e.g., 10 cm or less) a transmitting terminal, the reader mode of the transaction card 112 may activated and prompt the user for authorization to receive data through the GUI 111. This mode may only be suitable for mobile devices 110 with a UI element, such as an OK button and a screen, an LED to indicate that data reception is being requested, and/or other interfaces. Once the user authorizes the transmission, the transaction card 112 in this mode may receive, and locally store, process and may execute a transaction and/or forward received data to another entity. For example, the transaction card 112 in this mode may receive content through promotional posters, validating the purchase of a ticket, and/or others. For example, the transaction card 112 in this mode may function as a mobile POS terminal receiving transaction information from a plastic contactless card/FOB and instructing the POS 114 to prepare a transaction authorization request for the financial institution 106 through a cellular core network. Once the financial institution 106 authorizes the transaction, the mobile device 110 may display the confirmation of the transaction to the user through the GUI 111.

In regards to the self-train mode, the transaction card 112 may execute a version of the reader mode. In some implementations, the self-train mode can be activated by a special action (e.g., a needle point press to a small switch, entry of an administrative password via the GUI 111). In response to at least activating this mode, the transaction card 112 may be configured to receive personalization data over, for example, the short range wireless interface from another peer transaction card such as the plastic contactless cards compliant with this functionality and issued by the financial institution 106 or a specially prepared administrative card for this purpose. Personalization data received in this mode may include encrypted FV information that is stored in secured memory of the transaction card 112. In some implementations, the transaction card 112 in this mode may receive the FV information through a contactless interface of a transmitter and/or others. The transaction card 112 may then synthesize the FV information that corresponds to the user account and personalize an internal security module that includes, for example, payment applications for executing transactions with financial institutions 106 and associated user credentials. The self-train mode may be used to re-personalize the transaction card 112 in the field. In some implementations, all previous data can be deleted if the self-train mode is activated. The self-train mode may be a peer-to-peer personalization mode where the card 112 may receive personalization information from another transaction card 112. This mode may represent an additional personalization mode as compared with factory, store and/or Over-The-Air (OTA) personalization scenarios which may be server to client personalization scenarios. In some implementations, the self-train mode may be a peer-to-peer personalization mode where the transaction card 112 receives personalization information from another transaction card. Since two transaction cards 112 are used in this mode, this mode may be different from a server-to-client personalization scenario as with a factory, store, and OTA personalization.

In regards to the inactive mode, the transaction card 112 may temporarily deactivate the contactless interface. In some implementations, the inactive mode can be activated through the physical interface with the mobile device 110 such as a microSD interface. In response to at least the activation of the inactive mode, the transaction card 112 may temporarily behave as only a mass-memory card. In some implementations, the card 112 may also enter this state when the reset needle point is pressed. In this mode, the transaction card 112 may preserve locally-stored information including financial user data. In this mode, the transaction card 112 may execute the activation process and if successful may return to the active mode. Financial institutions 106 may use this mode to temporarily prevent usage in response to at least identifying at least potentially fraudulent activity.

In regards to the killed mode, the transaction card 112 may permanently deactivate the contactless interface. In some implementations, the killed mode is activated through the physical interface with the mobile device 110 such as a microSD interface. In response to at least the activation of the killed mode, the transaction card 112 may permanently behaves as a mass memory stick. In the event that the reset needle point is pressed, the transaction card 112 may, in some implementations, not be made to enter any other modes. In addition, the transaction card 112 may delete financial content in memory in response to at least this mode being activated. In some implementations, financial institutions 106 may use this mode to delete data from a transaction card 112 that is physically lost but still connected to the wireless network via the host device 110.

In regards to the memory mode, the transaction card 112 may operate as a mass memory stick such that the memory is accessible through conventional methods. In some implementations, the transaction card 112 may automatically activate this mode in response to at least being removed from the host device, inserted into a non-authorized host device, and/or other events. The transaction card 112 may be switched to active mode from the memory mode by, for example, inserting the card 112 into an authorized device or may be switched from this mode into the self-train mode to re-personalize the device for a new host device or a new user account. In some implementations, the memory mode may operate substantially same as the inactive mode.

In some implementations, the transaction card 112 may be re-personalized/updated such as using software device management process and/or a hardware reset. For example, the user may want to re-personalize the transaction card 112 to change host devices, to have multiple host devices, and/or other reasons. In regards to the software device management, the user may need to cradle the new host device with the transaction card 112 inserted to launch the software device management application. In some implementations, the software management application can be an application directly installed on the client 104, integrated as a plug-in to a normal synchronization application such as ActiveSync, available via a browser plug-in running on the plug-in provider's website, and/or other sources. The user may log into the application and verify their identity, and in response to verification, the application may allow access to a devices section in the device management application. The device management application may read the transaction card 112 and display the MAC addresses, signatures of the devices that he has inserted his plug-in to, and/or other device specific information. The mobile device 110 may be marked as active and the host device may be shown as disallowed or inactive. The application may enable the user to update the status of the new host device, and in response to at least the selection, the device management application may install the signature on the new host device and mark update the status as allowable in secure memory of the transaction card 112. The user may be able to also update the status of the mobile device 110 to disallowed. Otherwise, both devices may be active and the transaction card 112 may be switched between the two devices. In regards to the hardware reset process, the use may use the reset needle point press on the physical transaction card 112 to activate the self-train mode. In this mode, the financial data may be deleted and have to be reloaded. When the transaction card 112 is inserted into the new host device, the provisioning process may begin as discussed above.

The POS 114 can include any software, hardware, and/or firmware that receives from the transaction card 112 account information for executing a transaction with one or more financial institutions 106. For example, the POS 114 may be an electronic cash register capable of wirelessly communicating transaction information with the transaction card 112a. The POS 114 may communicate transaction information associated with traditional contact payment methods such as plastic cards and checks. If enabled for wireless/contactless payment transactions, the POS 114 may communicate information with the transaction card 112 in one or more the following formats: 14443 Type A/B, Felica, MiFare, ISO 18092, ISO 15693; and/or others. The transaction information may include verification information, check number, routing number, account number, transaction amount, time, driver's license number, merchant ID, merchant parameters, credit-card number, debit-card number, digital signature and/or other information. In some implementations, the transaction information may be encrypted. In illustrated implementation, the POS 114 can wirelessly receive encrypted transaction information from the transaction card 112 and electronically send the information to one or more of the financial institutions 106 for authorization. For example, the POS 114 may receive an indication that a transaction amount has been accepted or declined for the identified account and/or request additional information from the transaction card 112.

As used in this disclosure, the client 104 are intended to encompass a personal computer, touch screen terminal, workstation, network computer, a desktop, kiosk, wireless data port, smart phone, PDA, one or more processors within these or other devices, or any other suitable processing or electronic device used for viewing transaction information associated with the transaction card 112. For example, the client 104 may be a PDA operable to wirelessly connect with an external or unsecured network. In another example, the client 104 may comprise a laptop that includes an input device, such as a keypad, touch screen, mouse, or other device that can accept information, and an output device that conveys information associated with transactions executed with the financial institutions 106, including digital data, visual information, or GUI 115. In some implementations, the client 104b can wirelessly communicate with the transaction card 112b using, for example, an NFC protocol. In some implementations, the client 104a includes a card reader 116 having a physical interface for communicating with the transaction card 112c. In some implementations, the card reader 116 may at least include an adapter 116b that adapts the interface supported by the client 104 (e.g., USB, Firewire, Bluetooth, WiFi) to the physical interface supported by the card 112 (e.g., SD/NFC). In this case, the client 104a may not include a transceiver for wireless communication.

The GUI 115 comprises a graphical user interface operable to allow the user of the client 104 to interface with at least a portion of the system 100 for any suitable purpose, such as viewing transaction information. Generally, the GUI 115 provides the particular user with an efficient and user-friendly presentation of data provided by or communicated within the system 100. The GUI 115 may comprise a plurality of customizable frames or views having interactive fields, pull-down lists, and/or buttons operated by the user. The term graphical user interface may be used in the singular or in the plural to describe one or more graphical user interfaces and each of the displays of a particular graphical user interface. The GUI 115 can include any graphical user interface, such as a generic web browser or touch screen, that processes information in the system 100 and presents the results to the user. The financial institutions 106 can accept data from the client 104 using, for example, the web browser (e.g., Microsoft Internet Explorer or Mozilla Firefox) and return the appropriate responses (e.g., HTML or XML) to the browser using the network 108. In some implementations, the GUI 111c of the transaction card 112c may be presented through the GUI 115a of the client 104a. In these implementations, the GUI 115a may retrieve user credentials from the GUI 111c and populate financial forms presented in the GUI 115a. For example, the GUI 115a may present a forum to the user for entering credit card information to purchase a good through the Internet, and the GUI 115a may populate the form using the GUI 111c in response to at least a request from the user.

Financial institutions 106a-c can include any enterprise that may authorize transactions received through the network 108. For example, the financial institution 106a may be a credit card provider that determines whether to authorize a transaction based, at least in part, on information received through the network 106. The financial institution 106 may be a credit card provider, a bank, an association (e.g., VISA), a retail merchant (e.g., Target), a prepaid/gift card provider, an internet bank, and/or others. In general, the financial institution 106 may execute one or more of the following: receive a request to authorize a transaction; identify an account number and other transaction information (e.g., PIN); identify funds and/or a credit limit associated with the identified account; determine whether the transaction request exceeds the funds and/or credit limit and/or violates any other rules associated with the account; transmit an indication whether the transaction has been accepted or declined; and/or other processes. In regards to banking, the financial institution 106 may identify an account number (e.g., bank account, debit-card number) and associated verification information (e.g., PIN, zip code) and determine funds available to the account holder. Based, at least in part, on the identified funds, the financial institution 106 may either accept or reject the requested transaction or request additional information. As for encryption, the financial institution 106 may use a public key algorithm such as RSA or elliptic curves and/or private key algorithms such as TDES to encrypt and decrypt data.

Network 108 facilitates wireless or wired communication between the financial institutions and any other local or remote computer, such as clients 104 and the POS device 114. Network 108 may be all or a portion of an enterprise or secured network. While illustrated as single network, network 108 may be a continuous network logically divided into various sub-nets or virtual networks without departing from the scope of this disclosure, so long as at least a portion of network 108 may facilitate communications of transaction information between the financial institutions 106, the clients 104, and the offline store 102. In some implementations, network 108 encompasses any internal or external network, networks, sub-network, or combination thereof operable to facilitate communications between various computing components in system 100. Network 108 may communicate, for example, Internet Protocol (IP) packets, Frame Relay frames, Asynchronous Transfer Mode (ATM) cells, voice, video, data, and other suitable information between network addresses. Network 108 may include one or more local area networks (LANs), radio access networks (RANs), metropolitan area networks (MANs), wide area networks (WANs), all or a portion of the global computer network known as the Internet, and/or any other communication system or systems at one or more locations.

Figure 2:
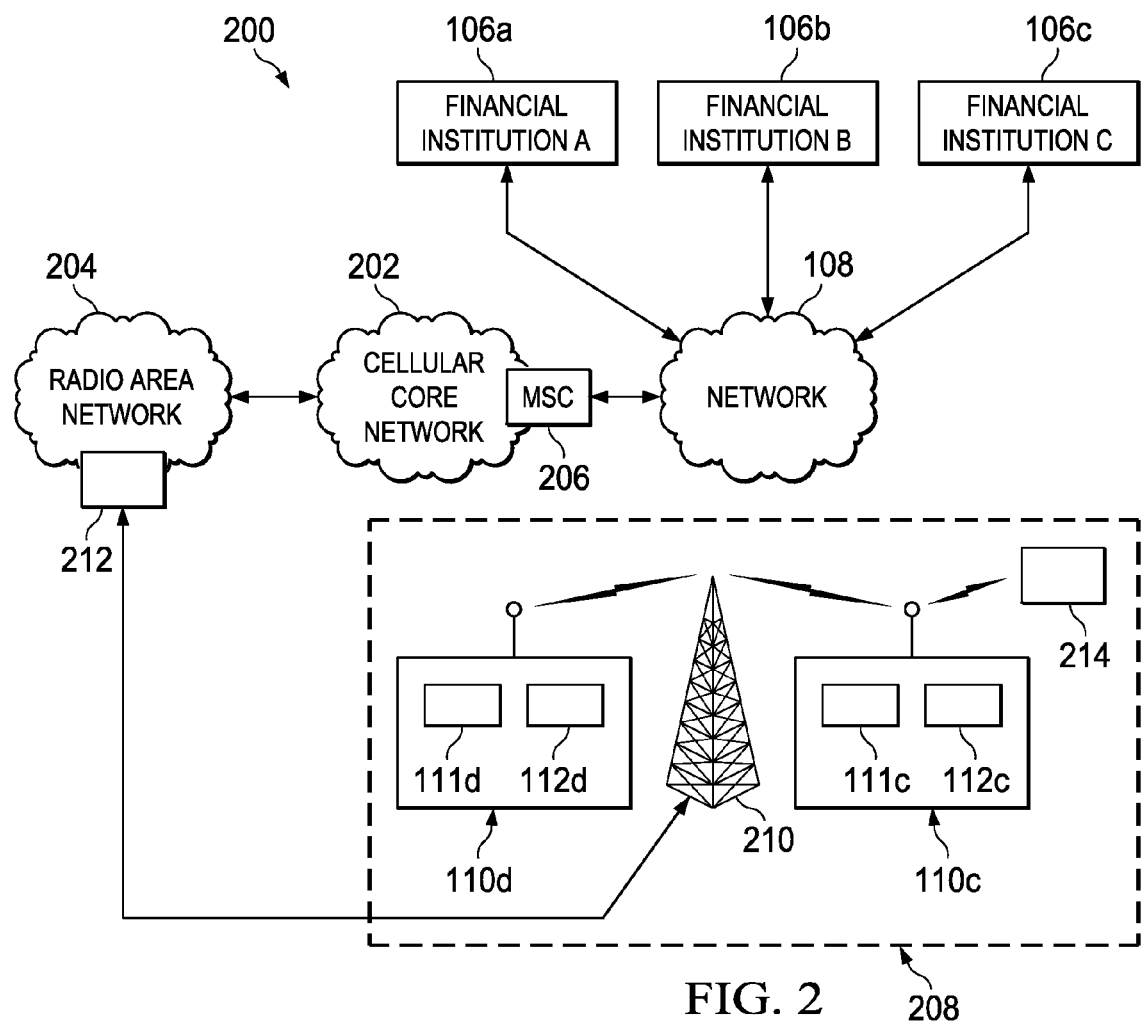
FIG. 2 is an example transactions system that transmits transaction information through a cellular core network.

FIG. 2 is a block diagram illustrating an example transaction system 200 for wirelessly communicating transactions information using cellular radio technology. For example, the system 200 may wirelessly communicate a transaction receipt to a transaction card 112 using a mobile host device 110 and cellular radio technology. In some implementations, cellular radio technology may include Global System for Mobile Communication (GSM), Code Division Multiple Access (CDMA), Universal Mobile Telecommunications System (UMTS), and/or any other cellular technology. The financial institutions 106 may assign one or more mobile host devices 110 to a transaction card 112 in response to one or more events. In some examples, the user may register the one or more mobile devices 110 with the financial institution 106 in connection with, for example, requesting the associated transaction card 112. In some examples, the transaction card 112 may register the mobile host device 110 with the financial institution 106 in response to at least an initial insertion into the device 110. Regardless of the association process, the system 100 may use the cellular capabilities of the host devices 110 to communicate information between the financial institutions 106 and the transaction card 112. In using the cellular radio technology of the host device 110, the system 100 may communicate with the transaction card 112 when the card 112 is not proximate a retail device, such as the POS device 114 of FIG. 1.

In the illustrated implementation, the cellular core network 202 typically includes various switching elements, gateways and service control functions for providing cellular services. The cellular core network 202 often provides these services via a number of cellular access networks (e.g., RAN) and also interfaces the cellular system with other communication systems such as the network 108 via a MSC 206. In accordance with the cellular standards, the cellular core network 202 may include a circuit switched (or voice switching) portion for processing voice calls and a packet switched (or data switching) portion for supporting data transfers such as, for example, e-mail messages and web browsing. The circuit switched portion includes MSC 206 that switches or connects telephone calls between radio access network (RAN) 204 and the network 108 or another network, between cellular core networks or others. In case the core network 202 is a GSM core network, the core network 202 can include a packet-switched portion, also known as General Packet Radio Service (GPRS), including a Serving GPRS Support Node (SGSN) (not illustrated), similar to MSC 206, for serving and tracking communication devices 102, and a Gateway GPRS Support Node (GGSN) (not illustrated) for establishing connections between packet-switched networks and communication devices 110. The SGSN may also contain subscriber data useful for establishing and handing over call connections. The cellular core network 202 may also include a home location register (HLR) for maintaining "permanent" subscriber data and a visitor location register (VLR) (and/or an SGSN) for "temporarily" maintaining subscriber data retrieved from the HLR and up-to-date information on the location of those communications devices 110 using a wireless communications method. In addition, the cellular core network 202 may include Authentication, Authorization, and Accounting (AAA) that performs the role of authenticating, authorizing, and accounting for devices 110 operable to access GSM core network 202. While the description of the core network 202 is described with respect to GSM networks, the core network 202 may include other cellular radio technologies such as UMTS, CDMA, and others without departing from the scope of this disclosure.

The RAN 204 provides a radio interface between mobile devices and the cellular core network 202 which may provide real-time voice, data, and multimedia services (e.g., a call) to mobile devices through a macrocell 208. In general, the RAN 204 communicates air frames via radio frequency (RF) links. In particular, the RAN 204 converts between air frames to physical link based messages for transmission through the cellular core network 202. The RAN 204 may implement, for example, one of the following wireless interface standards during transmission: Advanced Mobile Phone Service (AMPS), GSM standards, Code Division Multiple Access (CDMA), Time Division Multiple Access (TDMA), IS-54 (TDMA), General Packet Radio Service (GPRS), Enhanced Data Rates for Global Evolution (EDGE), or proprietary radio interfaces. Users may subscribe to the RAN 204, for example, to receive cellular telephone service, Global Positioning System (GPS) service, XM radio service, etc.

The RAN 204 may include Base Stations (BS) 210 connected to Base Station Controllers (BSC) 212. BS 210 receives and transmits air frames within a geographic region of RAN 204 (i.e. transmitted by a cellular device 102e) and communicates with other mobile devices 110 connected to the GSM core network 202. Each BSC 212 is associated with one or more BS 210 and controls the associated BS 210. For example, BSC 212 may provide functions such as handover, cell configuration data, control of RF power levels or any other suitable functions for managing radio resource and routing signals to and from BS 210. MSC 206 handles access to BSC 212 and the network 108. MSC 206 may be connected to BSC 212 through a standard interface such as the A-interface. While the elements of RAN 204 are describe with respect to GSM networks, the RAN 204 may include other cellular technologies such as UMTS, CDMA, and/or others. In the case of UMTS, the RAN 204 may include Node B and Radio Network Controllers (RNC).

The contactless smart card 214 is a pocket-sized card with embedded integrated circuits that process information. For example, the smart card 214 may wirelessly receive transaction information, process the information using embedded applications and wirelessly transmit a response. The contactless smart card 214 may wirelessly communicate with card readers through RFID induction technology at data rates of 106 to 848 kbit/s. The card 214 may wirelessly communicate with proximate readers between 10 cm (e.g., ISO/IEC 14443) to 50 cm (e.g., ISO 15693). The contactless smart card 214 operates independent of an internal power supply and captures energy from incident radio-frequency interrogation signals to power the embedded electronics. The smart card 214 may be a memory card or microprocessor card. In general, memory cards include only non-volatile memory storage components and may include some specific security logic. Microprocessor cards include volatile memory and microprocessor components. In some implementations, the smart card 214 can have dimensions of normally credit card size (e.g., 85.60×53.98×0.76 mm, 5×15×0.76 mm). In some implementations, the smart card 214 may be a fob or other security token. The smart card 214 may include a security system with tamper-resistant properties (e.g., a secure cryptoprocessor, secure file system, human-readable features) and/or may be configured to provide security services (e.g., confidentiality of stored information).

In some aspects of operation, the financial institution 106 may use the mobile host device 110 to communicate information to the transaction card 112. For example, the financial institution 106 may wirelessly communicate with the mobile host device 110 using the cellular core network 202. In some implementations, the financial institution 106 may transmit information to the mobile host device 110 in response to at least an event. The information may include, for example, transaction information (e.g., transaction receipt, transaction history), scripts, applications, Web pages, and/or other information associated with the financial institutions 106. The event may include completing a transaction, determining a transaction card 112 is outside the operating range of a POS terminal, receiving a request from a user of the mobile host device, and/or others. For example, the financial institution 106 may identify a mobile host device 110 associated with a card 112 that executed a transaction and transmit transaction information to the mobile host device 110 using the cellular core network 202. In using the cellular core network 202, the financial institutions 106 may transmit information to the transaction card 112 without requiring a POS terminal being proximate to the card 112. In addition or alternatively, the financial institution 106 may request information from the mobile host device 110, the transaction card 112 and/or the user using the cellular core network 202. For example, the financial institution 106 may transmit a request for transaction history to the card 112 through the cellular core network 202 and the mobile host device 110.

In some aspects of operation, a merchant or other entity may operate the mobile host device 110*c* as a mobile POS terminal configured to wirelessly execute transactions with the smart card 214. For example, a vendor may be mobile (e.g., a taxi driver) and may include a mobile host device 110*c* with a transaction card 112*c*. In this example, the transaction card 112*c* may wirelessly receive account information from the smart card 214 and the POS 114 may transmit an authorization request to the financial institution 106 using the mobile host device 110 and the cellular core network 202. In response to at least the request, the financial institution 106 may generate an authorization response to the transaction card 112*c* using the mobile host device 110 and the cellular network 202.

In some implementations, the system 100 may execute one or more of the modes discussed with respect to FIG. 1. For example, the transaction card 112 may be re-personalized/updated using the cellular radio technology of the mobile host device 110.

The user may want to re-personalize the transaction card 112 to change host devices, to have multiple host devices, and/or other reasons. In regards to the software device management, the user may transmit to the financial institution 106 a request to re-personalize the transaction card 112 using the cellular radio technology of the host device 110.

Figure 3:
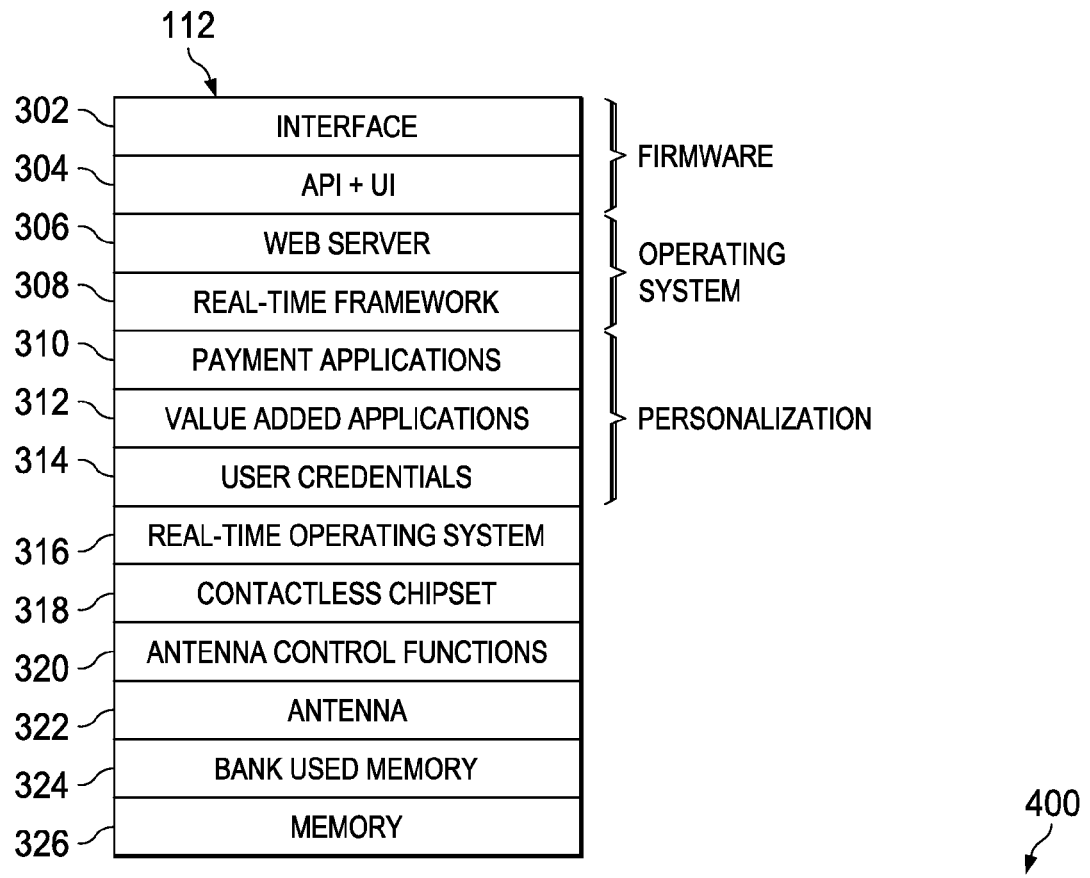
FIG. 3 is an example intelligent card of FIG. 1 in accordance with some implementations of the present disclosure.

FIG. 3 illustrates is a block diagram illustrating an example transaction card 112 of FIG. 1 in accordance with some implementations of the present disclosure. In general, the transaction card 112 includes personalized modules that execute financial transactions independent of the mobile device 110. The illustrated transaction card 112 is for example purposes only, and the transaction card 112 may include some, all or different modules without departing from the scope of this disclosure.

In some implementations, the transaction card 112 can include an interface layer 302, an API/UI 304, a Web server 306, a real-time framework 308, payment applications 310, value added applications 312, user credentials 314, real-time OS 316, contactless chipset 318, antenna control functions 320, antenna 322, bank used memory 324, and free memory 326. In some implementations, a host controller includes the interface layer 302, he API/UI 304, the Web server 306, the real-time framework 308, the contactless chipset 318, and the antenna control functions 320. In some implementations, a security module includes the payment applications 310 and the user credentials 314. The bank used memory 324 and free memory 326 may be contained in Flash. In some implementations, the contactless chipset 318 may be integrated within the security module or operated as a standalone. The antenna 322 may be electronic circuitry.

The interface layer 302 includes interfaces to both the host device, i.e., physical connection, and the external world, i.e., wireless/contactless connection. In payment implementations, the wireless connection can be based on any suitable wireless standard such as contactless (e.g., ISP 14443 A/B), proximity (e.g., ISO 15693), NFC (e.g., ISO 18092), and/or others. In some implementations, the wireless connection can use another short range wireless protocol such as Bluetooth, another proprietary interfaces used by retail payment terminals (Felica in Japan, MiFare in Asia, etc.), and/or others. In regards to the physical interface, the interface layer 302 may physically interface the mobile device 110 using an SD protocol such as MicroSD, Mini-SD or SD (full-size). In some implementations, the physical interface may include a converter/adapter to convert between two different protocols based, at least in part, on the mobile device 110. In some implementations, the mobile device 110 may communicate using protocols such as USB, MMC, iPhone proprietary interface, or others.

The API/UI layer 304 can include any software, hardware, and/or firmware that operates as an API between the mobile device 110 and the transaction card 112 and as the GUI 111. Prior to executing transactions, the transaction card 112 may automatically install drivers in the mobile device 110 in response to at least insertion. For example, the transaction card 112 may automatically install a MicroSD device driver in the device 110 to enable the transaction card 112 to interface the mobile device 110. In some implementations, the transaction card 112 may install an enhanced device driver such as a Mass Memory with Radio (MMR) API. In this implementation, the interface can drive a class of plug-ins that contain mass memory as well as a radio interface. The MMR API may execute one or more of the following: connect/disconnect to/from the MMR controller (Microcontroller in the plug-in); transfer data using MM protocol (e.g., SD, MMC, XD, USB, Firewire); send encrypted data to the MMR controller; receive Acknowledgement of Success or Error; received status word indicating description of error; turn radio on/off; send instruction to the transaction card 112 to turn the antenna on with specifying the mode of operation (e.g., sending mode, listening mode); transmit data such as send instruction to controller to transmit data via the radio; listen for data such as send instruction to controller to listen for data; read data such as send instruction to controller to send the data received by the listening radio; and/or others. In some implementations, MMR can be compliant with TCP/IP. In some implementations, API encapsulated ISO 7816 commands may be processed by the security module in addition to other commands.

In some implementations, the API can operate in accordance with the two processes: (1) the transaction card 112 as the master and the mobile device 110 as the slave; and (2) the card UI as the master. In the first process, the transaction card 112 may pass one or more commands to the mobile device 110 in response to, for example, insertion of the transaction card 112 into a slot in the mobile device 110, a transaction between the transaction card 112 and the POS 114, and/or other events. In some implementations, the transaction card 112 can request the mobile device 110 to execute one or more of following functions: Get User Input; Get Signature; Display Data; Send Data; Receive Data; and/or others. The Get User Input command may present a request through the GUI 111 for data from the user. In some implementations, the Get User Input may present a request for multiple data inputs. The data inputs may be any suitable format such as numeric, alphanumeric, and/or other strings of characters. The Get Signature command may request the mobile device 110 to return identification data such as, for example, a phone number, a device ID like an IMEI code or a MAC address, a network code, a subscription ID like the SIM card number, a connection status, location information, Wi-Fi beacons, GPS data, and/or other device specific information. The Display Data command may present a dialog to the user through the GUI 111. In some implementations, the dialog can disappear after a period of time, a user selection, and/or other event. The Send Data command may request the mobile device 110 to transmit packet data using its own connection to the external world (e.g., SMS, cellular, Wi-Fi). The Receive Data command may request the mobile device 110 to open a connection channel with certain parameters and identify data received through the connection. In some implementations, the command can request the mobile device 110 to forward any data (e.g., SMS) satisfying certain criteria to be forwarded to the transaction card 112.

In regards to the UI as master, the UI may execute one or more of the following commands: security module Command/Response; Activate/Deactivate; Flash Memory Read/Write; Send Data with or without encryption; Receive Data with or without decryption; URL Get Data/URL Post Data; and/or others. The security module commands may relate to security functions provided by the card and are directed towards the security module within the transaction card 112 (e.g., standard ISO 7816 command, proprietary commands). In some implementations, the commands may include encryption, authentication, provisioning of data, creation of security domains, update of security domain, update of user credentials after verification of key, and/or others. In some implementations, the commands may include non security related smart card commands such as, for example, read transaction history commands. The read transaction history command may perform a read of the secure memory 324 of the transaction card 112. In some implementations, certain flags or areas of the secure memory 324 may be written to after security verification. The Activate/Deactivate command may activate or deactivate certain functions of the transaction card 112. The Flash Memory Read/Write command may execute a read/write operation on a specified area of the non-secure memory 326. The Send Data with or without encryption command may instruct the transaction card 112 to transmit data using its wireless connection with, for example, the POS 114. In addition, the data may be encrypted by the transaction card 112 prior to transmission using, for example, keys and encryption capability stored within the security module. The Receive Data with or without decryption command may instruct the transaction card 112 to switch to listening mode to receive data from its wireless connection with the terminal/reader (e.g., POS 114). In some implementations, data decryption can be requested by the security module using, for example, keys and decryption algorithms available on the security module, i.e., on-board decryption. The URL Get Data/URL Post Data command may instruct the web server 306 to return pages as per offline get or post instructions using, for example, offline URLs.

The Web server 306, as part of the OS of the transaction card 112, may assign or otherwise associate URL style addressing to certain files stored in the memory 326 (e.g., flash) of the transaction card 112. In some implementations, the Web server 306 locates a file using the URL and returns the file to a browser using standard HTTP, HTTPS style transfer. In some implementations, the definition of the files can be formatted using standard HTML, XHTML, WML and/or XML style languages. The file may include links that point to additional offline storage locations in the memory 326 and/or Internet sites that the mobile device 110 may access. In some implementations, the Web server 306 may support security protocols such as SSL. The Web server 306 may transfer an application in memory 326 to the mobile device 111 for installation and execution. The Web server 306 may request the capabilities of the browser on the device 110 using, for example, the browser user agent profile, in order to customize the offline Web page according to the supported capabilities of the device and the browser, such as, for example, supported markup language, screen size, resolution, colors and such.

As part of the Real time OS, the real-time framework 308 may execute one or more functions based, at least in part, on one or more periods of time. For example, the real-time framework 308 may enable an internal clock available on the CPU to provide timestamps in response to at least requested events. The real-time framework 308 may allow certain tasks to be pre-scheduled such that the tasks are executed in response to at least certain time and/or event based triggers. In some implementations, the real-time framework 308 may allow the CPU to insert delays in certain transactions. In some implementation, a part of WAP standards called WTAI (Wireless Telephoney Application Interface) can be implemented to allow offline browser pages on the card 112 to make use of functions offered by the mobile device 110 (e.g., send/receive wireless data, send/receive SMS, make a voice call, play a ringtone etc.).

The payment applications 310 can include any software, hardware, and/or firmware that exchanges transaction information with the retail terminal using, in some instances, a pre-defined sequence and/or data format. For example, the payment applications 310 may generate a response to a transaction request by selecting, extracting or otherwise including user credentials in the response, in a format compatible with the retail terminal's payment processing application. In some implementations, the payment applications 310 may execute one or more of the following: transmit properties of the transaction card 112 in response to at least an identification request received from the POS 114; receive a request to execute a transaction from, for example, the POS 114; identify user credentials in the bank-used memory 324 in response to at least the request; generate a transaction response based, at least in part, on the user credentials; transmit the transaction response to the POS 114 using, for example, a contactless chipset; receive clear data, for example a random number, from the POS 114 and provide a response containing encrypted data by encrypting the clear data using the cryptographic capabilities of the secure element; transmit the encrypted data using the contactless chipset 318; increment a transaction counter with every transaction request received; transmit a value of the transaction counter in response to a request from the POS 114; store details of the transaction request received from the POS 114 into the transaction history area of the bank used memory 324; transmit transaction history to the CPU of the intelligent card 112 in response to such a request; receive ISO 7816 requests from the CPU of the intelligent card 112; execute corresponding transactions using the secure element OS; provide responses back to the CPU; and/or other processes. In generating the transaction response, the payment application 310 may generate the response in a format specified by the payment network (VISA, MasterCard, Amex, Discover) associated with a financial institution 106 or a proprietary format owned and defined by the financial institution 106 and processible by the POS 114. The transaction request may include one or more of the following: user credentials (e.g., account number); expiry data, card verification numbers; a transaction count; and/or other card or user information. In some implementations, the payment application 310 may comprises a browser application to enable transactions. The browser application 310 may be a browser that may be installed if the device 110 is either missing a browser or has a browser that is incompatible with the Web server 306 on the card 112. After installation of such browser 310, future communications between the mobile device 110 and the web-server 306 make use of the newly installed browser.

The real-time OS 316 may execute or otherwise include one or more of the following: real-time framework 308; a host process that implements the physical interface between the transaction-card CPU and the mobile device 110; an interface that implements the physical interface between the transaction-card CPU and the security module; a memory-management process that implements the ISO 7816 physical interface between the transaction-card CPU and the memory 324 and/or 326; an application-layer process that implements the API and UI capabilities; the Web server 306; antenna-control functions 320; power management; and/or others. In some implementations, the real-time OS 316 may manage the physical interface between the transaction-card CPU and the secure memory 324 that includes memory segmentation to allow certain memory areas to be restricted access and/or data buffers/pipes. In some implementations, the security module can include a security module OS provided by the security module Vendor and may be compliant with Visa and MasterCard specifications. The security module OS may structure the data in the security module to be compliant with Paypass and/or payWave specifications or any other available contactless retail payment industry specifications. In addition, the security module may store host device signatures and allow modes of the antenna 322 in the secure element 324. In some implementations, the real-time OS 316 may include a microcontroller OS configured to personalizing the secure element 324 such as by, for example, converting raw FV data (account number, expiry date, Card Verification Number (CVN), other application specific details) into secure encrypted information. In addition, the microcontroller OS may present the card 112 as a MicroSD mass storage to the host device. The microcontroller OS may partition the memory into a user section and a protected device application section. In this example, the device application section may be used to store provider specific applications that either operate from this segment of the memory or are installed on the host device from this segment of the memory.

The security module chip may provide tamper-resistant hardware security functions for encryption, authentication, management of user credentials using multiple security domains, on-board processing capabilities for personalization, access and storage, and/or others. In some implementations, the security module chip can include the contactless chipset 318.

The contactless chipset 318 may provides the hardware protocol implementation and/or drivers for RF communication. For example, the contactless chipset 318 may include on-board RF circuitry to interface with an external world connection using a wireless/contactless connection. The wireless connection may be, for example, client to node (terminal/reader/base station), node to client (passive tag), or peer to peer (another transaction card 112).

The antenna control function 320 may controls the availability of the RF antenna. For example, the antenna control function 320 may activate/deactivate the antenna 322 in response to, for example, successful authentication, completion of a routine established by the OS 316, and/or other event. The antenna 322 may be a short range wireless antenna connected to an NFC inlay via a software switch such as a NAND Gate or other element.

Figure 4:
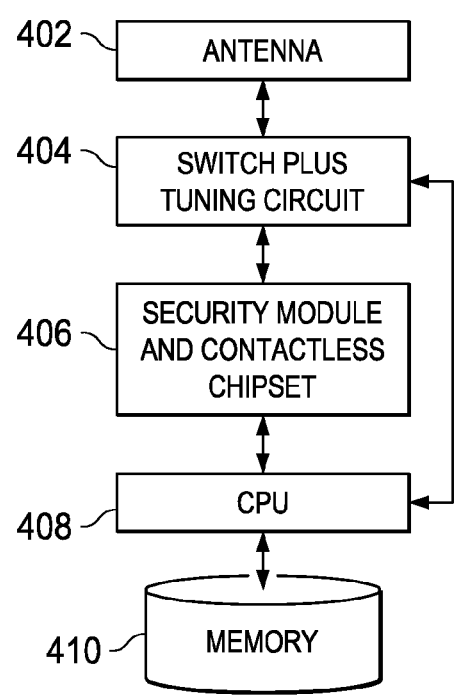
FIG. 4 is an example intelligent card that selectively switching an antenna.

FIG. 4 is a block diagram illustrating an example intelligent card 400 in accordance with some implementations of the present disclosure. For example, the transaction card of FIG. 1 may be implemented in accordance with the illustrated intelligent card 400. In general, the intelligent card 400 may independently access services and/or transactions. The intelligent card 400 is for illustration purposes only and may include some, all, or different elements without departing from the scope of the disclosure.

As illustrated, the intelligent card 400 includes an antenna 402, a switch plus tuning circuit 404, a security module and contactless chipset 406, a CPU 408 and memory 410. The antenna 402 wirelessly transmits and receives signals such as NFC signals. In some implementations, the switch plus tuning circuit 404 may dynamically adjust the impedance of the antenna 402 to tune the transmit and/or receive frequency. In addition, the switch plus tuning circuit 404 may selectively switch the antenna 402 on and off in response to at least a command from the CPU 408. In some implementations, the antenna 402 can be a short range wireless antenna connected to an NFC inlay via a software switch such as an NAND Gate or other element to allow for code from the CPU 408 to turn the antenna 402 on and off. In some implementations, the card 400 may include an NFC inlay (not illustrated) that can be a passive implementation of NFC short range wireless technology deriving power from the reader terminal in order to transmit data back or a stronger implementation using an eNFC chipset to power active reader mode and self-train mode. In addition, the card 400 may include an external needle point reset (not illustrated) that prompts the CPU 408 to depersonalize the memory or secure element.

The CPU 408 may transmit the switching command in response to an event such as a user request, completion of a transaction, and/or others. When switched on, the security chip and contactless chipset 406 is connected to the antenna 402 and executes one or more of the following: format signals for wireless communication in accordance with one or more formats; decrypt received messages and encrypt transmitted messages; authenticate user credentials locally stored in the memory 410; and/or other processes. The memory 410 may include a secure and non-secured section. In this implementation, the secure memory 410 may store one or more user credentials that are not accessible by the user. In addition, the memory 410 may store offline Web pages, applications, transaction history, and/or other data. In some implementations, the memory 410 may include Flash memory from 64 MB to 32 GB. In addition, the memory 410 may be partitioned into user memory and device application memory. The chipset 406 may include a security module that is, for example Visa and/or MasterCard certified for storing financial vehicle data and/or in accordance with global standards. In addition to a user's financial vehicle, the secure element may store signatures of allowed host devices and/or antenna modes.

In some implementations, the CPU 408 may switch the antenna 402 between active and inactivate mode based, at least in part, on a personalization parameter defined by, for example, a user, distributor (e.g., financial institution, service provider), and/or others. For example, the CPU 408 may activate the antenna 402 when the intelligent card 400 is physically connected to a host device and when a handshake with the host device is successfully executed. In some implementations, the CPU 408 may automatically deactivate the antenna 402 when the intelligent card 400 is removed from the host device. In some implementations, the antenna 402 is always active such that the intelligent card 400 may be used as a stand-alone access device (e.g., device on a keychain). In regards to the handshaking process, the CPU 408 may execute one or more authentication processes prior to activating the intelligent card 400 and/or antenna 402 as illustrated in FIG. 7. For example, the CPU 408 may execute a physical authentication, a device authentication, and/or a user authentication. For example, the CPU 408 may activate the antenna 402 in response to at least detecting a connection to the physical interface with the host device (e.g., SD interface) and successful installation of the device driver for mass memory access (e.g., SD device driver) on the host device. In some implementations, device authentication may include physical authentication in addition to a signature comparison of a device signature stored in memory (e.g., security module (SE)) that was created during first-use (provisioning) to a run-time signature calculated using, for example, a unique parameter of the host device. In the event no host device signature exists in the memory, the CPU 408 may bind with the first compatible host device the card 400 is inserted into. A compatible host device may be a device that can successfully accomplish physical authentication successfully. If a host-device signature is present in the memory, the CPU 408 compares the stored signature with the real-time signature of the current host device. If the signatures match, the CPU 408 may proceed to complete the bootstrap operation. If the signatures do not match, host device is rejected, bootstrap is aborted and the card 400 is returned to the mode it was before being inserted into the device.

User authentication may include verification of physical connection with a user using a PIN entered by the user, a x.509 type certificate that is unique to the user and stored on the host device, and/or other processes. Device and user authentication may verify a physical connection with device through comparison of a device signature and user authentication through verification of user PIN or certificate. In some implementations, the user can select a PIN or certificate at provisioning time. If this case, the CPU 408 may instantiate a software plug-in on the host device. For example, a software plug-in may request the user for his PIN in real time, read a user certificate installed on the device (e.g., x.509), and/or others. The operation of the software plug-in may be customized by the provider. Regardless, the returned user data may be compared with user data stored in the memory. In case of a successful match, the antenna 402 may be activated. In case of an unsuccessful match of a certificate, then card 400 is deactivated. In case of unsuccessful PIN match, the user may be requested to repeat PIN attempts until a successful match or the number of attempts exceeds a threshold. The disk provider may customize the attempt threshold.

In regards to network authentication, the host device may be a cellphone such that the card 400 may request network authentication prior to activation. For example, the card 400 may be distributed by a Wireless Network Operator (WNO) that requires a network authentication. In this example, a flag in memory may be set to ON indicating that network authentication is required. If the flag is set to ON, a unique identity about the allowed network is locally stored in memory such a Mobile Network Code for GSM networks, a NID for CDMA networks, a SSID for broadband networks, and/or identifiers. If this flag is ON, the CPU 408 in response to at least insertion may request a special software plug-in to be downloaded to the host device and instantiated. This software plug-in may query the host device to respond with network details. In some cases, the type of unique network identity employed and the method to deduce it from the host device may be variable and dependent on the network provider and capability of the host device. If the locally-stored ID matches the request ID, the CPU 408 activated the antenna 402 to enable access or otherwise services are denied.

Figure 5A:
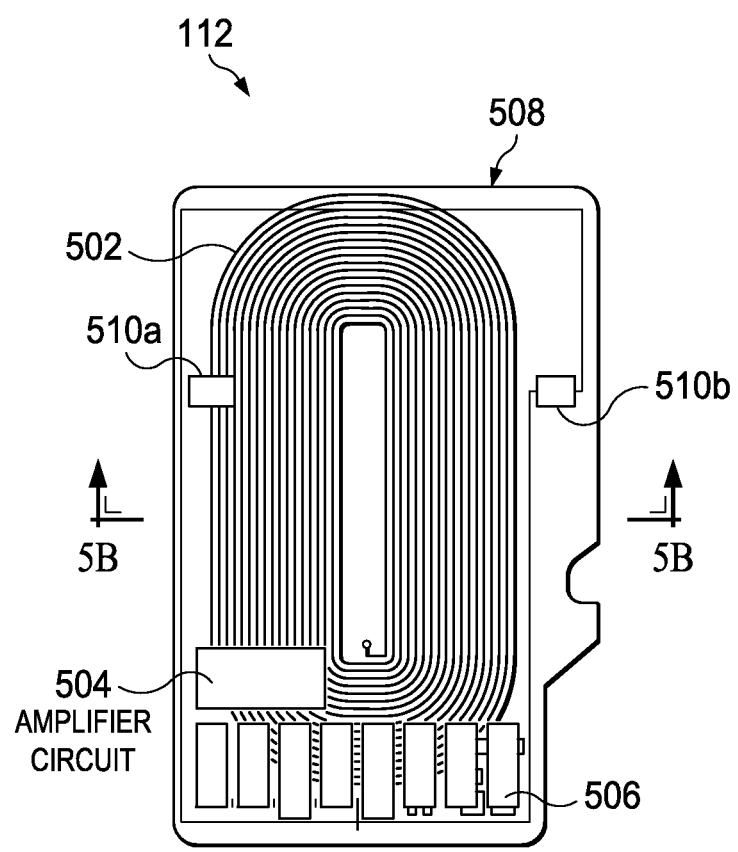
FIGS. 5A and 5B illustrate an example of antenna design 1.
Figure 5B:
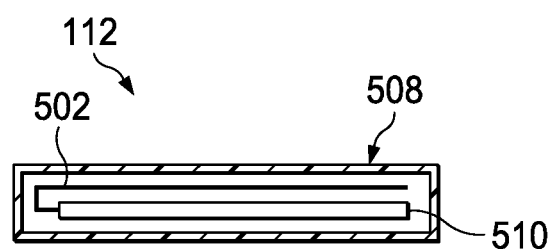

FIGS. 5A and 5B illustrate an example transaction card 112 in accordance with some implementations of the present disclosure. In the illustrated implementation, the transaction card 112 includes a shape and dimensions exactly the same or substantially similar to a standard MicroSD card. The transaction card 112 includes an antenna 502 for wirelessly communicating with, for example, retail terminals (e.g., POS 114) using RF signals and an SD interface 506 for physically interfacing a device (e.g., mobile device 110). The antenna 502 may be a flat coil (e.g., copper coil) integrated on one or more layers the MicroSD transaction card 112, a printed circuit (e.g., copper circuit) etched on one or more layers of the MicroSD transaction card 112, and/or other configuration for wirelessly transmitting and receiving RF signals. In some implementations, the antenna 502 may be substantially planar and adjacent at least a portion of the housing 508 of the transaction card 112 (e.g., top, bottom). The antenna 502 may include a width of at least approximately 9 mm and a length of at least approximately 14 mm. As illustrated in FIG. 5B, the antenna 502 is connected to a transaction circuit 510 (e.g., a contactless chipset) using, for example, a tuning circuit that tunes the antenna 502 to one or more frequencies. The one or more frequencies may be based, at least in part, on the terminal and/or type of terminal (e.g., POS 114). For example, the tuning circuit may tune the antenna 502 to 13.56 MHz for ISO 14443 related transactions. In some implementations, the antenna 502 may include insulation to substantially prevent signals from interfering with the circuit 510, mobile device 110, battery elements, and/or other elements that may be proximate to the transaction card 112. The transaction card 112 may include an amplifier circuit 504 to amplify (e.g., a factor of 10) signals generated by the antenna 502. In some implementations, the amplifier 504 may be of two types. For example, the amplifier 504 may be a passive amplifier that uses passive circuitry to amplify the RF signals received by the antenna (see FIGS. 13A and 13B) and/or a powered active amplifier that uses the energy from the battery of the host device to operate the transaction circuit (see FIG. 14A and FIG. 14B). In some implementations, the transaction card 112 may contain two additional RF interface pins 509A and 509B to allow the transaction card to use an external antenna, for example, an antenna contained in a separate housing for transactions and/or personalization.

Figure 6A:
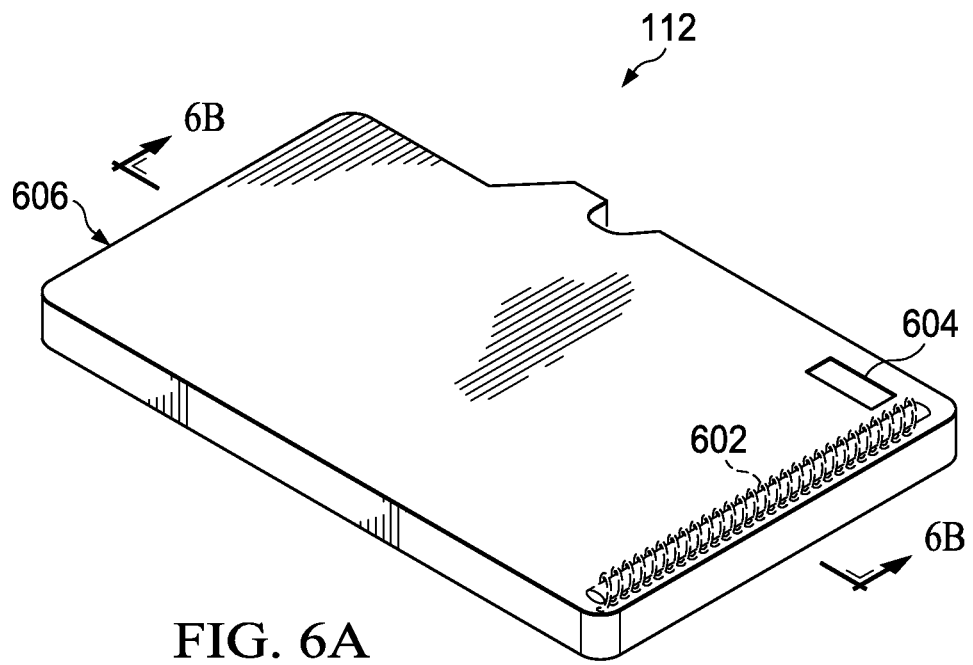
FIGS. 6A and 6B illustrate another example of antenna design
Figure 6B:
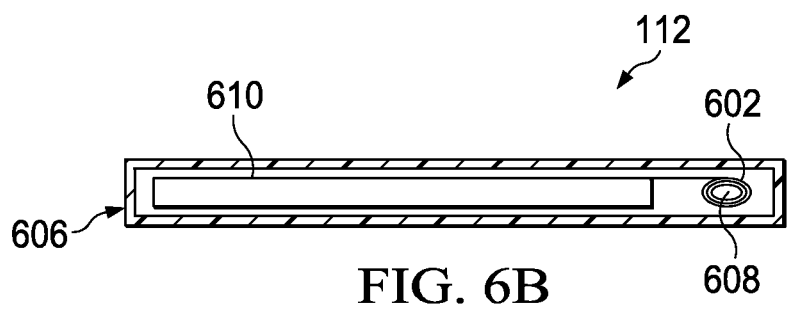

FIGS. 6A and 6B illustrate another example of the transaction card 112 in accordance with some implementations of the present disclosure. In the illustrated implementation, the transaction card 112 includes a three-dimensional antenna 602. For example, the antenna 602 may include a shape that is substantially helical such as a three-dimensional antenna coil. In addition, the transaction card 112 may include a housing 608 enclosing the antenna 602 and a transaction circuit 610. As illustrated in FIG. 6B, the antenna 602 may include a core 608 that substantially defines a length and a width of a three-dimensional shape of the antenna 602. In some implementations, the core 608 may comprise a middle segment of the transaction card 112 such that the width of the antenna coil 602 is substantially similar to the transaction card 112. The core 608 may reflect at least some wireless signals to substantially isolate the magnetic field from the transaction circuit 610, the mobile device 110, battery elements, and/or other elements proximate the antenna 602 in such a way that the magnetic field is concentrated in a direction substantially pointing away from the host device. The illustrated antenna 602 can be connected to the transaction circuit 610 (e.g., contactless chipset). In some implementations, the antenna 602 may be connected to a tuning circuit that substantially tunes the antenna 602 to one or more frequencies compatible with, for example, a retail terminal 114. For example, the tuning circuit may tune the antenna 602 to 13.56 MHz for ISO 14443 related transactions. The transaction card 112 may include an amplifier circuit 604 to amplify (e.g., a factor of 10) wireless signals generated by the antenna 602. In some implementations, the amplifier 604 may be of two types. For example, the amplifier 604 may be a passive amplifier that uses passive circuitry to amplify the RF signals received by the antenna (see FIGS. 13A and 13B) and/or a powered active amplifier that uses the energy from the battery of the host device to operate the transaction circuit (see FIG. 14A and FIG. 14B).

Figure 7A:
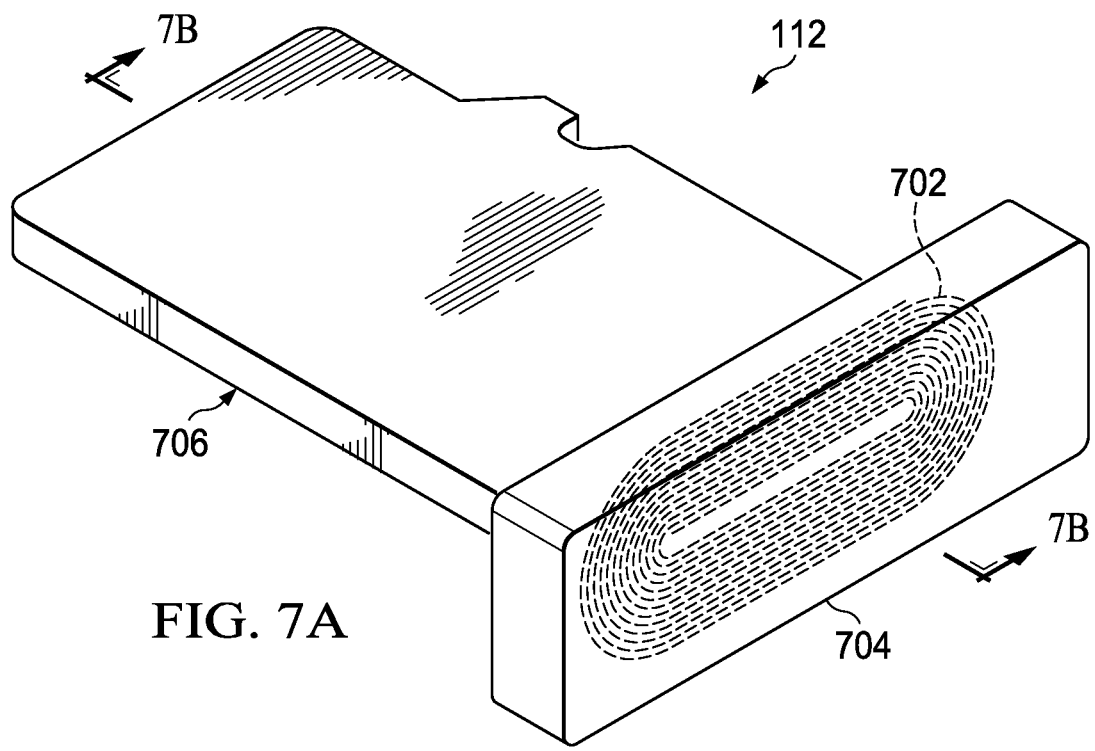
FIGS. 7A and 7B illustrate another example of antenna design
Figure 7B:
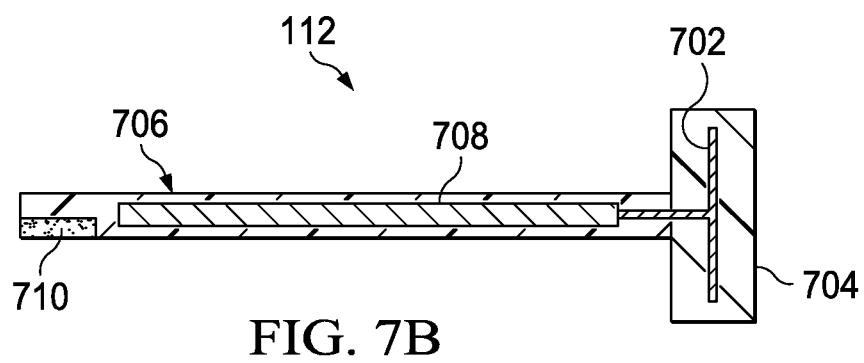

FIGS. 7A and 7B illustrate an example transaction card 112 including an external antenna 702 in accordance with some implementations of the present disclosure. In the illustrated implementation, the transaction card 112 can include an antenna 702 enclosed in a resilient member 704 and external to a housing 706 of the transaction card 112. The antenna 702 and the resilient member 704 may extend outside the SD slot during insertion of the housing 706. In some cases, the housing 706 may be substantially inserted into the slot of the device (e.g., mobile device 110). In the illustrated implementation, the housing 706 can include a shape and dimensions exactly the same or substantially similar to a standard MicroSD card. The antenna 702 wirelessly communicates with, for example, retail terminals (e.g., POS 114) using RF signals. In addition, the transaction card 112 may include an SD interface 710 for physically interfacing a device (e.g., mobile device 110). The antenna 702 may be a substantially planar coil (e.g., copper coil) integrated into one or more layers, a printed circuit (e.g., copper circuit) etched into one or more layers, and/or other configuration for wirelessly transmitting and receiving RF signals. The enclosed antenna 702 and the housing 706 may form a T shape. In some implementations, the antenna 702 may be substantially planar and adjacent at least a portion of the housing 708 of the transaction card 112 (e.g., top, bottom). The antenna 702 may include a width in the range of approximately 9 mm and a length in the range of approximately 14 mm. The resilient member 704 may be rubber, foam, and/or other flexible material. In some implementations, a flat, cylindrical or other shaped block of ceramic antenna may be used instead of the resilient member 704 and antenna 702. As illustrated in FIG. 7B, the antenna 702 is connected to a transaction circuit 710 (e.g., a contactless chipset) using, for example, a tuning circuit that tunes the antenna 702 to one or more frequencies. The one or more frequencies may be based, at least in part, on the terminal and/or type of terminal (e.g., POS 114). For example, the tuning circuit may tune the antenna 702 to 13.56 MHz for ISO 14443 related transactions. In some implementations, the antenna 702 may include insulation using material (e.g., Ferrite) to substantially isolate and direct magnetic field signals away from interfering with the circuit 710, mobile device 110, battery elements, and/or other elements that may be proximate to the transaction card 112 in such a way that the magnetic field is concentrated in a direction substantially pointing away from the host device slot in which the transaction card is inserted. The transaction card 112 may include an amplifier circuit 712 to amplify (e.g., a factor of 10) signals generated by the antenna 702. In some implementations, the amplifier 712 may be of two types. For example, the amplifier 712 may be a passive amplifier that uses passive circuitry to amplify the RF signals received by the antenna (see FIGS. 13A and 13B) and/or a powered active amplifier that uses the energy from the battery of the host device to operate the transaction circuit (see FIG. 14A and FIG. 14B).

FIGS. 8A-C illustrate an example transaction card 112 including an external three-dimensional antenna 802 in accordance with some implementations of the present disclosure. In the illustrated implementation, the transaction card 112 can include an antenna 802 enclosed in a resilient member 804 and external to a housing 806 of the transaction card 112. The antenna 802 and the resilient member 804 may extend outside the SD slot receiving the housing 806. In some cases, the housing 806 may be substantially inserted into the slot of the device (e.g., mobile device 110). In the illustrated implementation, the housing 806 can include a shape and dimensions exactly the same or substantially similar to a standard MicroSD card. The antenna 802 wirelessly communicates with, for example, retail terminals (e.g., POS 114) using RF signals. In addition, the transaction card 112 may include an SD interface 808 for physically interfacing a device (e.g., mobile device 110). The member 804 may include an arcuate outer surface and/or a substantially flat surface that abuts a portion of the housing 806. As illustrated in FIG. 8C, the antenna 802 may include a core 810 that substantially defines a length and a width of a three-dimensional shape of the antenna 802. The core 810 may reflect at least some wireless signals to substantially isolate the magnetic field from the transaction card 112, the mobile device 110, battery elements, and/or other elements proximate the antenna 802 in such a way that the magnetic field is concentrated in a direction substantially pointing outside the host device. In some implementations, the core 810 may include a cylindrical ferrite core around which the antenna 802 of the transaction card 112 is wrapped. In some implementations, the core 810 may substantially reflect signals away from the transaction card circuitry, mobile device 110, battery elements, and/or other elements that may be proximate to the transaction card 112 in such a way that the magnetic field is concentrated in a direction substantially pointing away from the host device. The antenna 802 may include a width in a range of 9 mm and a length in a range of 14 mm. The resilient member 804 may be rubber, foam, and/or other flexible material. As illustrated in FIG. 8B, the antenna 802 is connected to a transaction circuit 810 (e.g., a contactless chipset) using, for example, a tuning circuit that tunes the antenna 802 to one or more frequencies. The one or more frequencies may be based, at least in part, on the terminal and/or type of terminal (e.g., POS 114). For example, the tuning circuit may tune the antenna 702 to 13.56 MHz for ISO 14443 related transactions. The transaction card 112 may include an amplifier circuit 812 to amplify (e.g., a factor of 10) signals generated by the antenna 802. In some implementations, the amplifier 812 may be of two types. For example, the amplifier 812 may be a passive amplifier that uses passive circuitry to amplify the RF signals received by the antenna (see FIGS. 13A and 13B) and/or a powered active amplifier that uses the energy from the battery of the host device to operate the transaction circuit (see FIG. 14A and FIG. 14B). In some implementations, the transaction card 112 may contain two additional RF interface pins 814a and 814b to allow the transaction card to use an external antenna, for example, an antenna contained in a separate housing for transactions and/or personalization.

Figure 9A:
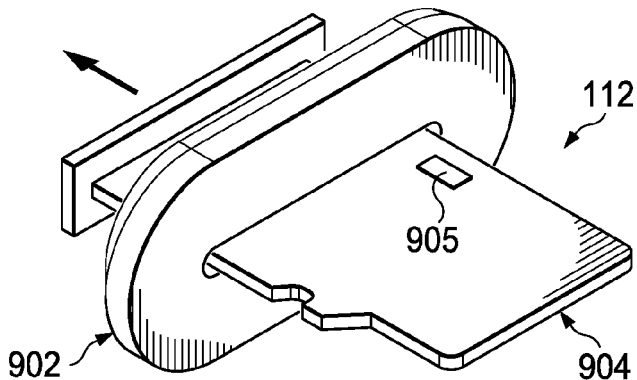
FIGS. 9A-9D illustrate another example of antenna design.
Figure 9B:
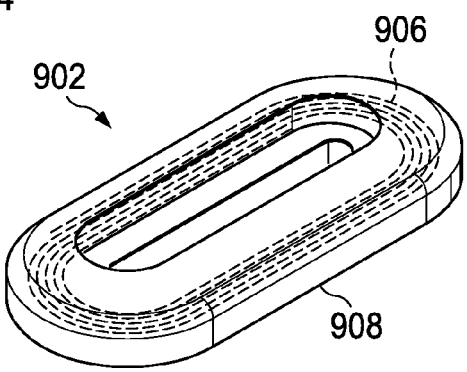
Figure 9C:
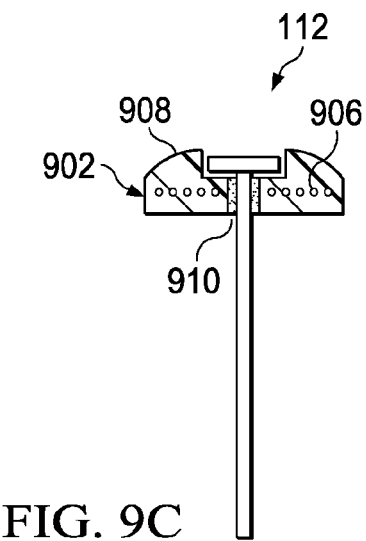
Figure 9D:
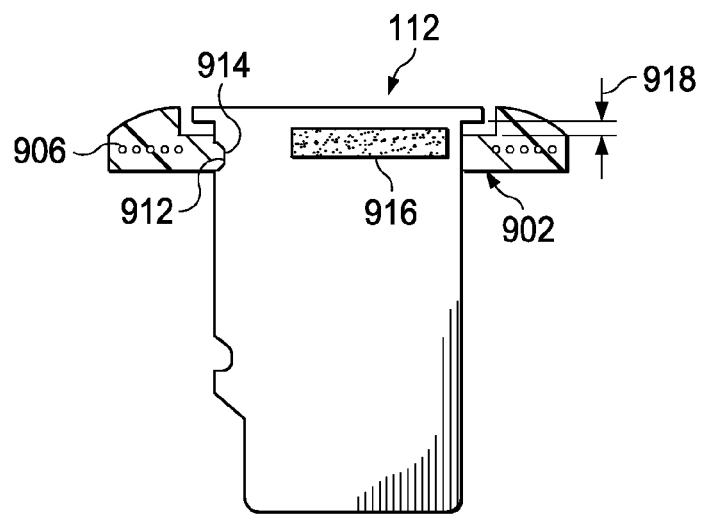

FIGS. 9A-9D illustrate an example transaction card 112 an antenna element 902 and a card element 904. In the illustrated implementations, the card element 904 can be inserted into the antenna element 902 to form the transaction card 112. The antenna element 902 may include an antenna 906 enclosed in a resilient member 908 as illustrated in FIG. 9B and include antenna connections 910 for connecting the antenna 906 to the card element 904. The card element 904 may include card connections 916 corresponding to the antenna connections 910 that connect to, for example, the contactless chipset. By selectively positioning the antenna element 902 and the card element 904, the antenna connections 910 may abut the card connections 916 to form an electrical connection between the two elements. In addition to an electric connection, this connection may also provide a mechanical lock between the antenna element 902 and the card element. Once attached, the contactless chipset may be connected to the antenna 906 using a tuning circuit that tunes the antenna 906 to one or more frequencies for wireless communicating with, for example, the retail terminal 114. For example, the tuning circuit may tune the antenna 906 to 13.56 MHz for ISO 14443 related transactions.

In some implementations, the card element 904 can include a width and a thickness the same or substantially the same as a standard MicroSD card such that at least a portion of the card element 904 may be inserted into a standard MicroSD slot. In some instances, the card element 904 may be 3-5 mm longer than a standard MicroSD card. The card element 904 may include a head protrusion that is slightly wider and/or thicker than a main body of the card element 904. The antenna element 902 typically extends outside of the MicroSD slot after insertion of the card element 904. In some implementations, the antenna element 902 may include a rounded curvature facing away from the slot during insertion and a flat surface on the other side. In some implementations, the antenna element 902 may form an opening having a width approximately 1-2 mm wide. The width of the opening may be approximately equal to the thickness of the main body of the card element 904. In some implementations, the width of the opening may match the thickness of the head protrusion of the card element 904. In the protrusion example, the thinner side of the card element 904 may be initially inserted into the antenna element 902. In some implementations, the head protrusion of the card element 904 after insertion may be substantially flush with the opening. In this instance, the antenna element 902 and the card element 904 may form a cap with flat ends connected by a curvature. The antenna element 902 may be soft rubber, foam, and/or other material that may conform to portions of an SD slot during insertion of the card element 904. The antenna 906 may be a flexible PCB including a thin copper antenna coil that is etched and/or mounted to form the antenna 906. In some implementations, the card element 904 may include a notch 914 for receiving a portion of the antenna element 902 such as the protrusion 912. In this case, the notch 914 and the protrusion 912 may substantially secure the card element 904 in the antenna element 902.

Figure 10A:
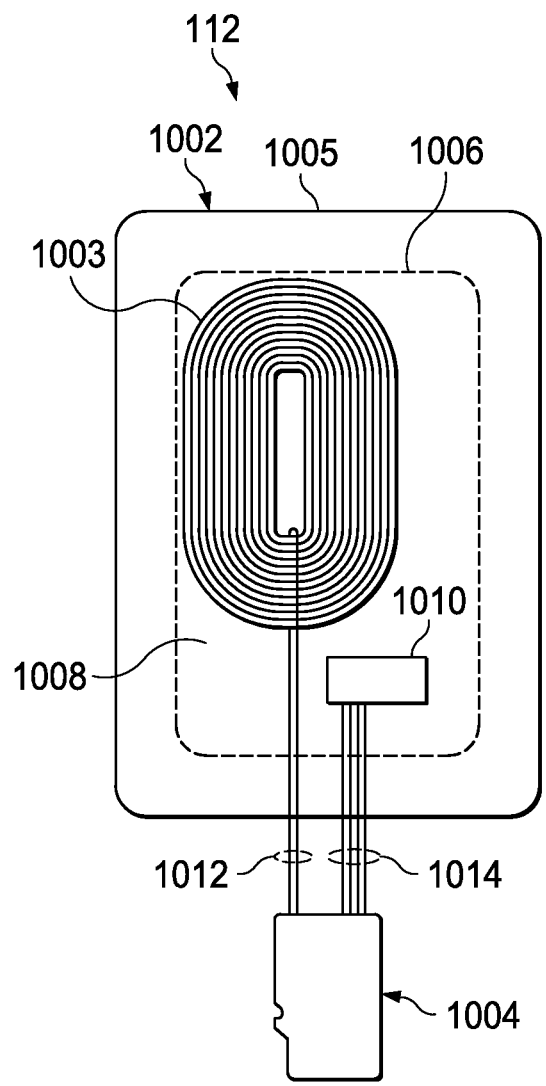
FIGS. 10A and 10B illustrate another example of antenna design.
Figure 10B:
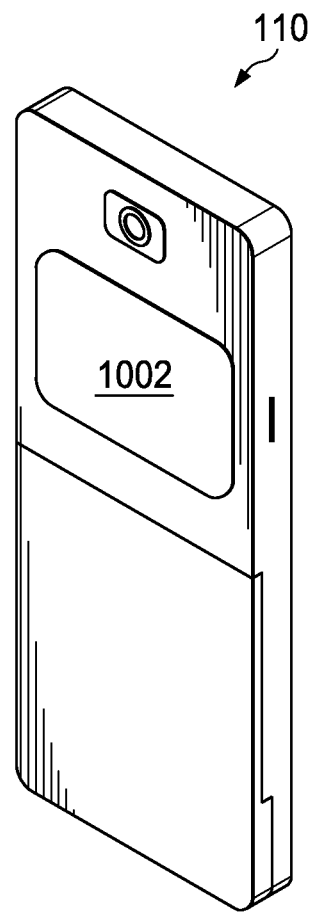

FIGS. 10A and 10B illustrates another implementation of the transaction card 112. In the illustrated implementation, the transaction card 112 includes an antenna element 1002 connected to a card element 1004. The card element 1004 may include the same or substantially the same dimensions as a standard MicroSD card such that the card element 1004 may be inserted into an SD slot. The antenna element 1002 may be attached to a surface of, for example, a mobile device 110. In the illustrated element, the antenna element 1002 includes a base 1005 affixed to a surface and configured to receive a pad 107. For example, the base 1005 may be configured to secure the pad 107 adjacent a surface of the mobile device 110 as illustrated in FIG. 10B. In some implementations, the base 1005 may include an adhesive plastic base including a detachable perforation 1006. The pad 1007 may extend around a mobile device and attaches to the base 1005. In some examples, the base 1005 and the pad 1007 may form a thin and flat sticker on the surface of the phone. The pad 1007 may include an antenna 1003, a non-adhesive pad 1008, and/or peripherals elements 1010. The outside portion of the pad 1007 may include a plastic inlay enclosing the antenna 1003 of the transaction card 112. The antenna 1003 may include copper coils etched on a very thin plastic film forming one of the layers of the inlay. The antenna 1003 may be connected to the contactless chipset of the card element 1004 using a connector 1012 (e.g., a flexible thin film) that wraps around the edge of the mobile device 110. The connector 1012 may connect the antenna 1003 to the contactless chipset using a tuning circuit that tunes the antenna 1003 to one or more frequencies compatible with, for example, the retail terminal 114. For example, the tuning circuit may tune the antenna 1003 to 13.56 MHz for ISO 14443 related transactions. The base 1005 may include a ferrite material that substantially isolates RF analog signals and the magnetic field from the mobile device 110 (e.g., circuits, battery) in which case the connector may include additional connectivity wires than those used for antenna connection only. The pad 1007 may also contain another peripheral 1010 such as a fingerprint scanner connected to a corresponding logical element in the card element 1004 using the same connector 1014.

Figure 11A:
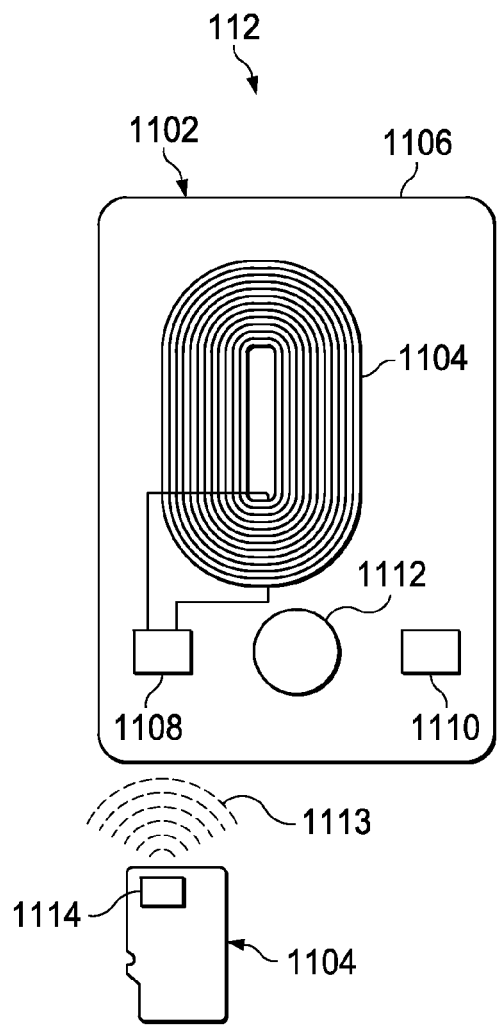
FIGS. 11A and 11B illustrate another example of antenna design.
Figure 11B:
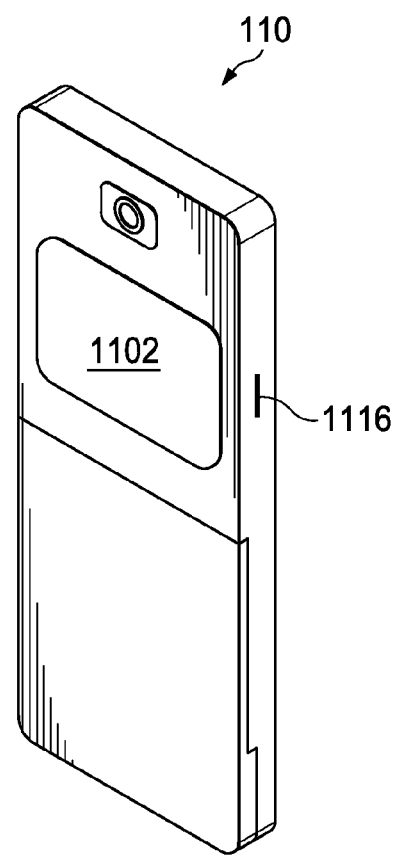

FIGS. 11A and 11B illustrate an example transaction card 112 including a wireless connection between an antenna element 1102 and a card element 1104. For example, the antenna element 1102 and the card element 1104 may include a wireless connection such as Bluetooth. The card element 1104 may include the same shape and dimensions as a standard MicroSD card such that the card element 1104 is substantially in an SD slot during insertion. The antenna element 1102 may be affixed to a surface of a device housing the card element 1104. In some implementations, the antenna element 1102 can form a thin and flat sticker on the surface of the mobile device 110 as illustrated in FIG. 11B. The antenna element 1102 may include a plastic inlay enclosing at least a portion of the antenna 1104. The antenna 1104 may include a copper coil etched on a very thin plastic film forming one or more layers of the inlay. The antenna 1104 may connect to the card element 1104 (e.g., the contactless chipset) using a wireless pairing connection 1113 between a transceiver chip 1114 in the card element 1114 and a corresponding transceiver chip 1108 in the antenna element 1108. The wireless connection 1113 may connect the antenna 1104 to the card element 1104 using a tuning circuit that tunes the antenna 1104 to one or more frequencies compatible with, for example, the retail terminal 114. The wireless pairing connection used in this case may be in the high frequency spectrum (e.g., 900 Mhz, 2.4 GHz), which are unlicensed and free for use by domestic appliances, for example. For example, the tuning circuit may tune the antenna 1104 to 13.56 MHz for ISO 14443 related transactions. The antenna element 1102 may include a ferrite material that reflects wireless signals to substantially prevent interference with the mobile device 1110. The antenna element 1102 may also contain another peripheral 1110 such as a fingerprint scanner wirelessly connected to a corresponding logical element in the card element using the same wireless connection 1113.

Figure 12A:
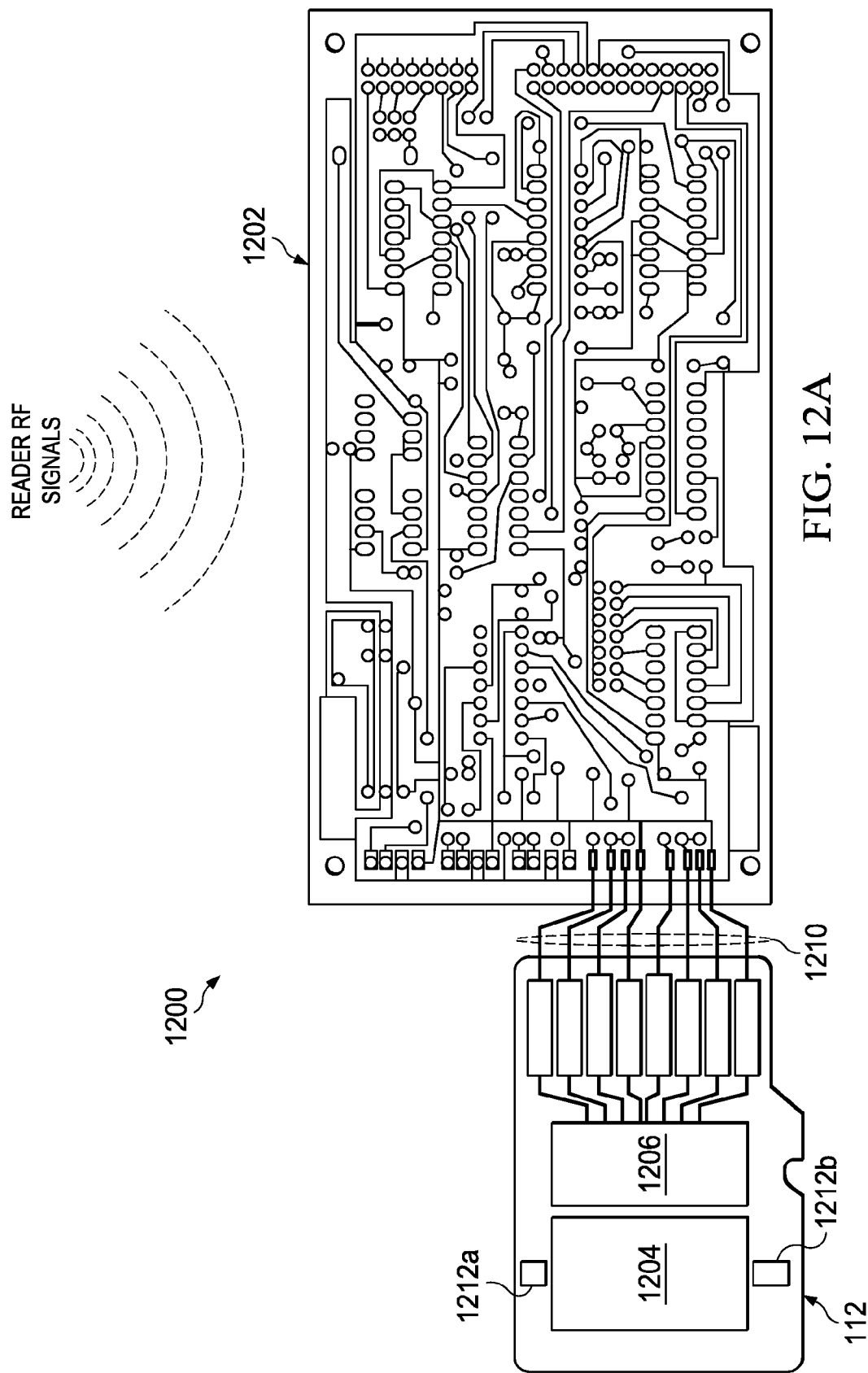
FIGS. 12A and 12B illustrates yet another example of an antenna design.
Figure 12B:
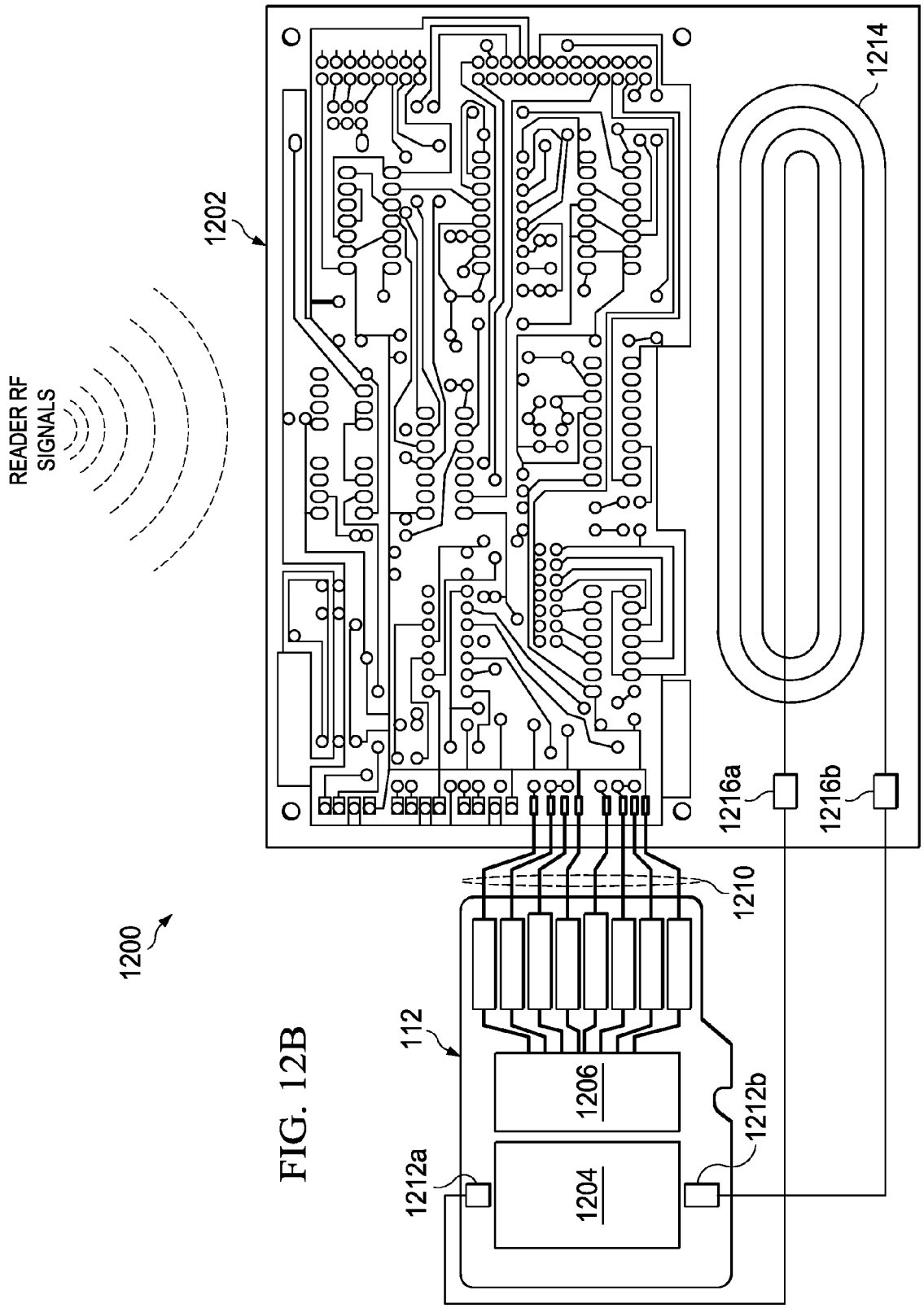

FIGS. 12A and 12B illustrate example transaction cards 112 using a circuit board 1202 of a mobile device to receive and transmit wireless RF signals. Referring to FIG. 12A, the transaction card 112 includes a plurality of connections 1210 to the circuit board 1202 to interface the mobile device 110. Typically, the circuit board 1202 includes interconnecting copper wires that communicate digital signals. In some implementations, the circuit board 1202 may communicate analog signals in addition to the digital signals such as RF signals. In these instances, the transaction card 112 may include a frequency filter circuit 1206 to filter out RF signals (e.g., 13.56 MHz) transmitted by a retail terminal and received by the circuit board 1202. In addition to receiving RF signals, the transaction card 112 may communicate an analog RF signal to the circuit board 1202 to transmit RF signals to the retail terminal. In some implementations, the transaction card 112 may contain two additional RF interface pins 1212*a* and 1212*b* to allow the transaction card to use an external antenna, for example, an antenna contained in a separate housing for personalization and/or transaction.

Referring to FIG. 12B, the circuit board 1202 includes an external antenna 1214 that may be used by the transaction card 112. In this case, the original SD interface PINS 1210 may be used for the sole purpose of standard SD host communication. The external antenna 1214 may be embedded in, affixed to or otherwise included on the board 1202. The external antenna 1214 are connected to the pins 1216a and 1216b on the circuit board 1202 such that when the transaction card 112 is inserted into the mobile device the card 112 is connected to the external antenna 1214. In some implementations, the pins 1212a and pins 1212b can connect to two the pins 1216a and 1216b on the handset circuit board 1202, which are in turn connected to the antenna 1214 tuned to receive reader signals. The pins 1216 are positioned on the handset board 1202 such that upon insertion of, for example, the MicroSD in the phone, 1212a connects to 1216a and 1212b connects to 1216b. In these implementations, the transaction card 112 can exchange RF signals with the reader using the handset antenna 1214 and the pins 1212 and 1216.

Figure 13A:
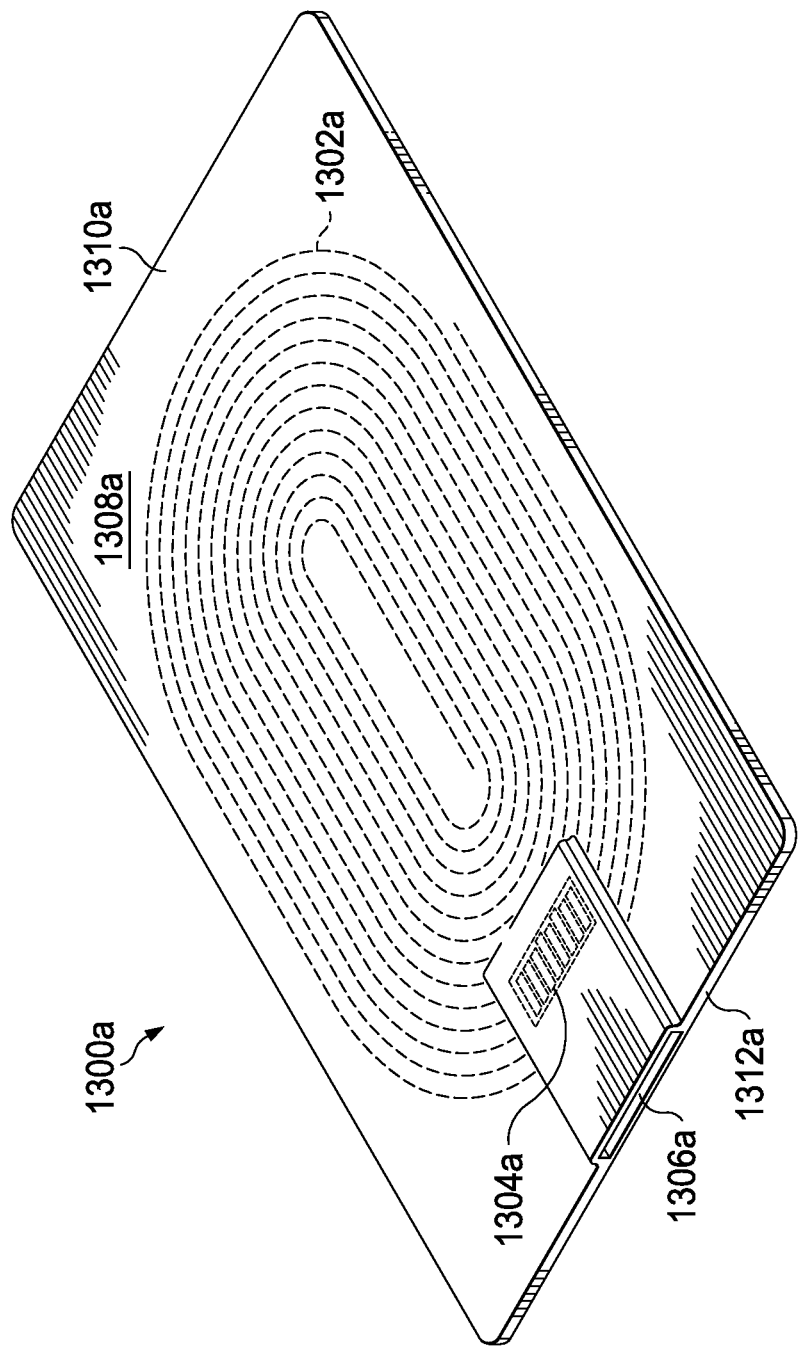
FIGS. 13A-C illustrate example card elements for receiving transaction cards of FIG. 1.
Figure 13B:
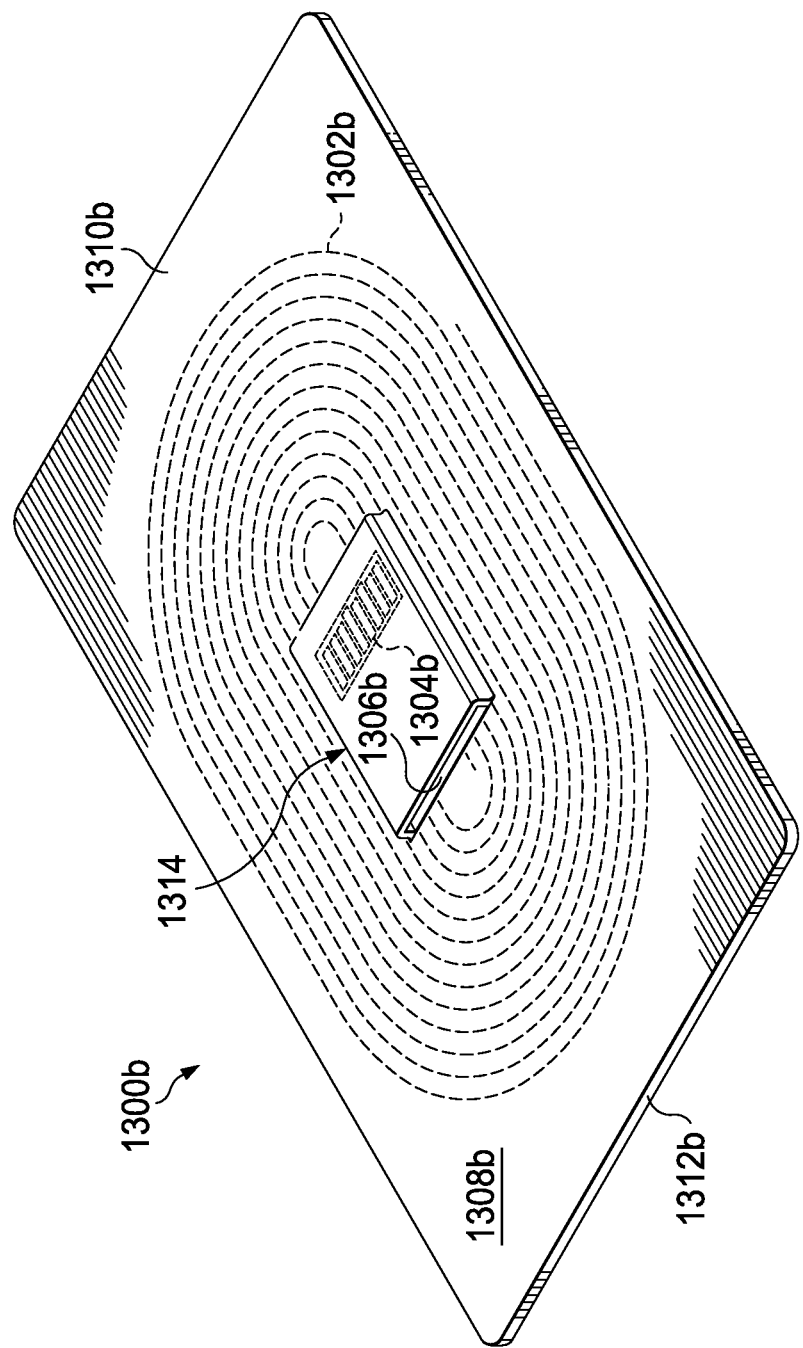
Figure 13C:
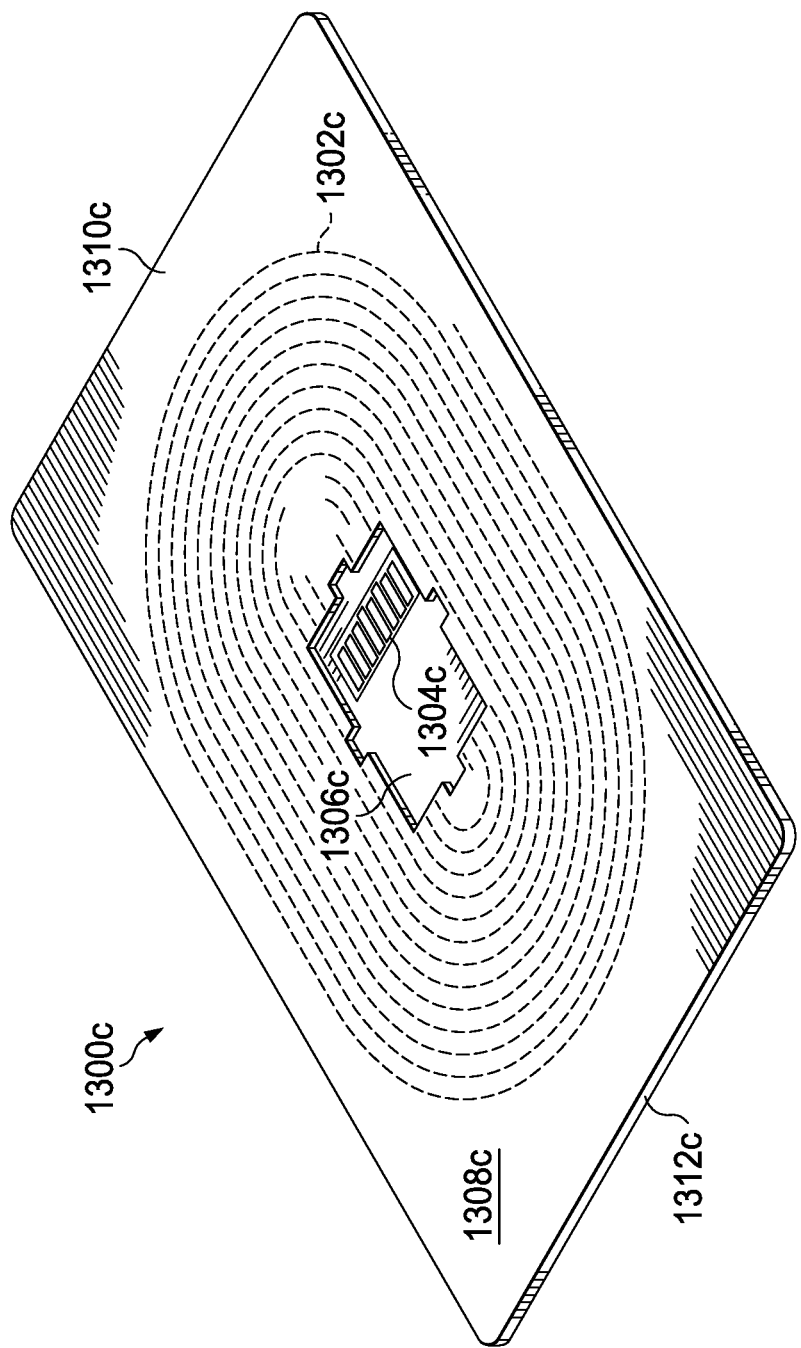

FIGS. 13A-C illustrate example card elements 1300a-c for receiving transaction cards 110 in accordance with some implementations of the present disclosure. For example, the card element 1300 may amplify the range of the transaction card 112 of FIG. 1 using a larger antenna external. In some implementations, the card element 1300 may include one or more of the following advantages: extend wireless transaction ranges; enable personalization of the transaction card without modification of current personalization systems; can be mass produced; and/or others. In some instances, the card element 1300 may include an outer edge (see FIG. 15B) that is compatible with current personalization machines. In other words, the transaction card 112 may be personalized using current personalization machines independent of modifying the physical operation of the personalization machines. In some instances, the card element 1300 may be mass produced using a few elements, as discussed with respect to FIGS. 15A and 15B.

In the illustrated implementations, the card element 1300 includes an antenna 1302, a connector 1304 and an opening 1306 formed in a housing 1308 of the element 1300. In some implementations, the card element 1300 may include a flexible material such as PVC, ABS, and/or other material. A transaction card 112 may be inserted into the opening 1306 to connect the card 112 to the antenna 1302. In some implementations, the transaction card 112 may be substantially enclosed in the housing 1308 after insertion. In addition, the transaction card 112 may be inserted and removed multiple times to switch between using the transaction card 112 with the card element 1300 and using the card 112 with, for example, the mobile device 110. In other words, the card elements 1300a-c may be designed such that after removing the card 112, the card 112 can be re-inserted in and re-used with the card elements 1300. In these instances, removing the card 112 from the card element 1300 may not permanently break their connection, which may be re-established after re-insertion.

As a result of engaging with the connector 1304, the transaction card 112 may switch between from using an internal antenna enclosed in the card 112 to the external antenna 1302 enclosed in the card element 1300. The larger, external antenna 1302 may increase the sensitivity when and/or range for executing wireless transactions with, for example, the POS 114. In some implementations, the card element 1300 is substantially rectangular and includes one or more dimensions of a credit card in accordance with the ISO/IEC 7810 standard as ID-1. For example, the card element 1300 may be approximately 85.60×53.98 mm (3.370×2.125 in). In addition, the card system 130 may include one or more portions with a thickness of approximately 0.76 mm. In some implementations, the card element 1300 can include portions with varying thickness such as one portion with a thickness substantially equivalent to a credit card and another portion with a thickness of about equal to a thickness of an SD card (e.g., microSD card) or greater. For example, the card system 130 may include a portion with a thickness of about 0.76 mm and another portion with a thickness of at least about 1 mm. Referring to FIG. 13A, the card system 1302 includes a top surface 1310a and a side surface 1312a such that the opening 1306a is formed in the side surface 1312a. In this implementation, the transaction card 112 is inserted into the opening 1306a on the card element 1300a and connects to the connector 1304a. The card 112 may be oriented substantially parallel to the top surface 1310a. While the connector 1304 is illustrated as an SD PIN connector, the connector 1304 may be another connector without departing from the scope of this disclosure such as a proprietary connector, USB connector, and/or others. Referring to FIG. 13B, the card element 1300b includes a top surface 1310a, a side surface 1312b, and a pocket element 1314. The top surface 1310a and the pocket element 1314 form the opening 1306b for receiving the transaction card 112. In this implementation, the card 112 can be inserted into the opening 1306b and connected to the connector 1304b. After insertion, the card 112 may be substantially parallel to the top surface 1310b. Referring to FIG. 13C, the card element 1300c includes a top surface 1310c and a side surface 1312c substantially perpendicular to the top surface 1310c. In this implementation, the top surface 1310c forms an opening 1306c for receiving the transaction card 112. After insertion, the card 112 may be connected to the antenna 1302c through the connector 1304c and may be substantially parallel to the top surface 1310c of the card element 1300c. In this implementation, the transaction card is retained in the opening 1306 using a friction fit and/or through the notches on each edge of the housing that holds the transaction card in place.

Figure 14A:
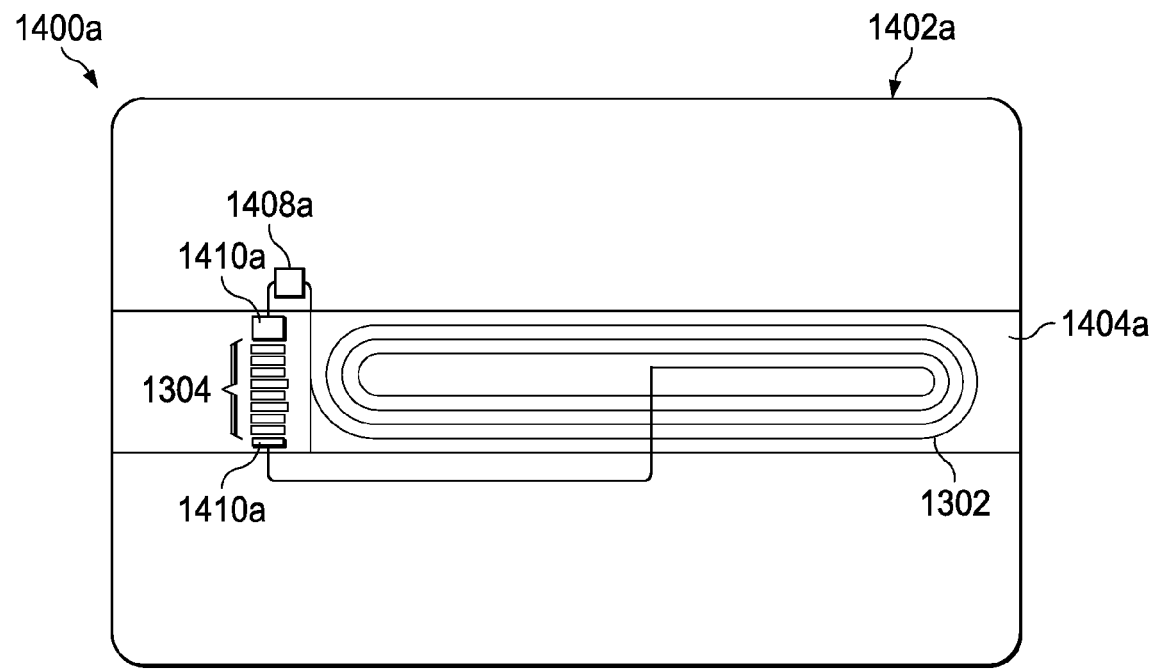
FIGS. 14A-C illustrate example bottom portions of the card elements in FIGS. 13A-C.
Figure 14B:
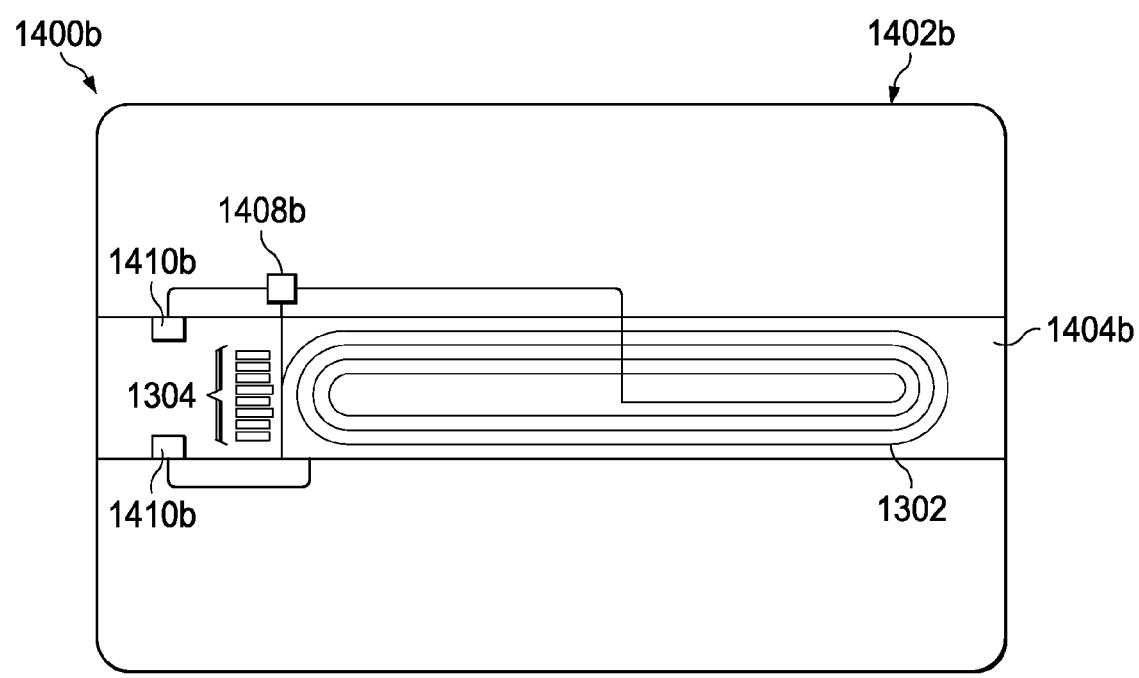
Figure 14C:
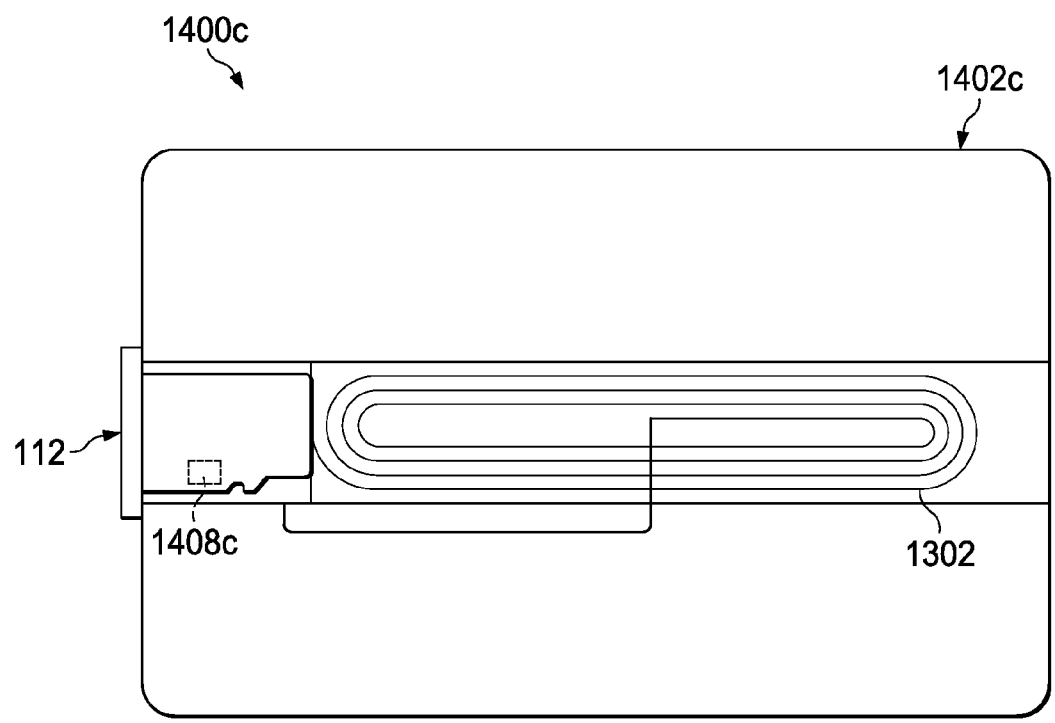

FIGS. 14A-C illustrate two example portions 1400a and 1400b of a card element 1300 in FIG. 13. In this implementation, the portion 1400a includes a bottom element 1402 that forms a recess 1404 to receive the antenna 1302. For example, the bottom element 1402 may be a plastic molded to include the recess 1404. In other words, the bottom element 1402 may include a cavity 1404 for receiving the antenna 1302. In connection with placement, the antenna 1302 is connected to antenna pins 1410 through a multiplexer 1408. The multiplexer 1408 switches the antenna connection of the transaction card 112 to between an internal antenna and the external antenna 1302. While illustrated as external to the transaction card 112, the multiplexer 1408 may be included in the card 112 without departing from the scope of this disclosure. The antenna pins 1410 may be pins associated with a standard SD configuration such as the outer pins. In some implementations, the transaction card 112 includes pins that are not in accordance with the standard SD configuration as illustration by connector pins 1410b. For example, the transaction card 112 and the corresponding card element 1400 may include extra contacts for connecting to the antenna 1302 as illustrated in FIG. 14B. In FIG. 14C, the transaction card 112 houses, encloses, or otherwise includes the multiplexer 1408c. For example, the multiplexer 1408c may be enclosed in the housing of the transaction card 112 as compared to being enclosed in the card element 1300 as illustrated in FIGS. 14B and C. In some implementations, the card element 1300 may solely include the antenna 1302 and SD PIN connectors 1304. The transaction card 112 may use the multiplexer 1408c to selectively switch between the internal antenna and the antenna 1302 included in the card element 1300. In these instances, the transaction card 112 may execute wireless transactions independent of external processing devices such as independent of devices included in the card element 1300 (e.g., receiver, transmitter, multiplexer)

Figure 15A:
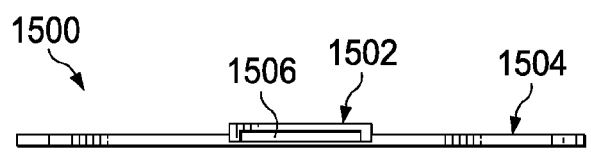
FIGS. 15A and 15B illustrate example side views of card elements.
Figure 15B:
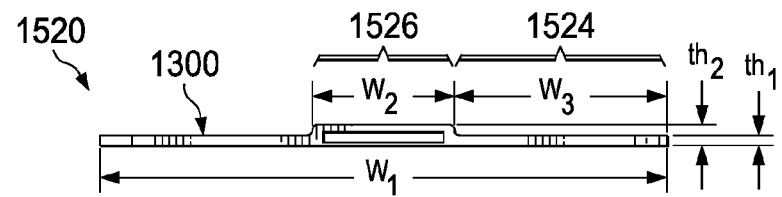

FIGS. 15A and 15B illustrate example profiles 500 and 520 of a card element 1300 in accordance with some implementations of the present disclosure. In this implementation, the profiles 500 and 520 illustrate side views of the card element 1300 before and after bonding two card elements. Referring to FIG. 15A, the profile 1500 illustrates a top element 1502 and a bottom element 1504. For example, the bottom element 1504 may be a side view of the bottom element 1402 illustrated in FIG. 14A or 14B. As illustrated, the bottom element 1504 forms a recess or cavity that receives the top element 1502 prior to affixment. Referring to FIG. 15B, the profile 1520 illustrates a side view of the top element 1502 affixed to the bottom element 1504 to form, for example, the card element 1300. For example, the top element 1502 and the bottom element 1504 may fused together using, for example, heat. Regardless, the affixed elements 1300 include a first portion 1524 with a first thickness indicated by $th_1$ and a second portion 1526 with a second thickness indicated by $th_2$. In some implementations, the first thickness may be approximately a width of a credit card such as, for example, 0.76 mm and/or other widths that comply with standards such as ISO 7810, ID1 and CR80. In some implementations, the second thickness may be at least a thickness of an SD card such as, for example, between about 1 mm and 2.1 mm. In addition, the affixed elements 1300 include a first width ($w_1$) indicating a width of the card element 1300, a second width ($w_2$) indicating a width of the second portion 1526, and a third width ($w_3$) indicating a width associated a portion 1524 used during the personalization process. In some implementations, the first width may be approximately the same width as a standard credit card in accordance with ISO/IEC 7810 standard. In some implementations, the second width may be at least a width of a microSD card such as, for example, about 11 mm, 20 mm, or 24 mm. The third width may be sufficient to personalize the transaction card 112 using standard personalization machines when inserted into the card element 1300. In some implementations, the third width may be sufficient to receive a mag stripe such as about 9.52 mm. In addition, the third width may be sufficient for graphical personalization such as embossing an account number, name, and expiration date. In these instances, the third width may be sufficient to affix a mag stripe, a signature strip, and/or printing characters. In some implementations, the outer edge identified by $W_3$ may be compatible with current personalization without requiring physical modification. To ensure physical compatibility, width $W_3$ may not be equal to $w_1-(w_2+w_3)$ as the width required by the magnetic stripe ($w_3$) may be wider than the width required for simply holding the card as it passes through the personalization system.

Figure 16A:
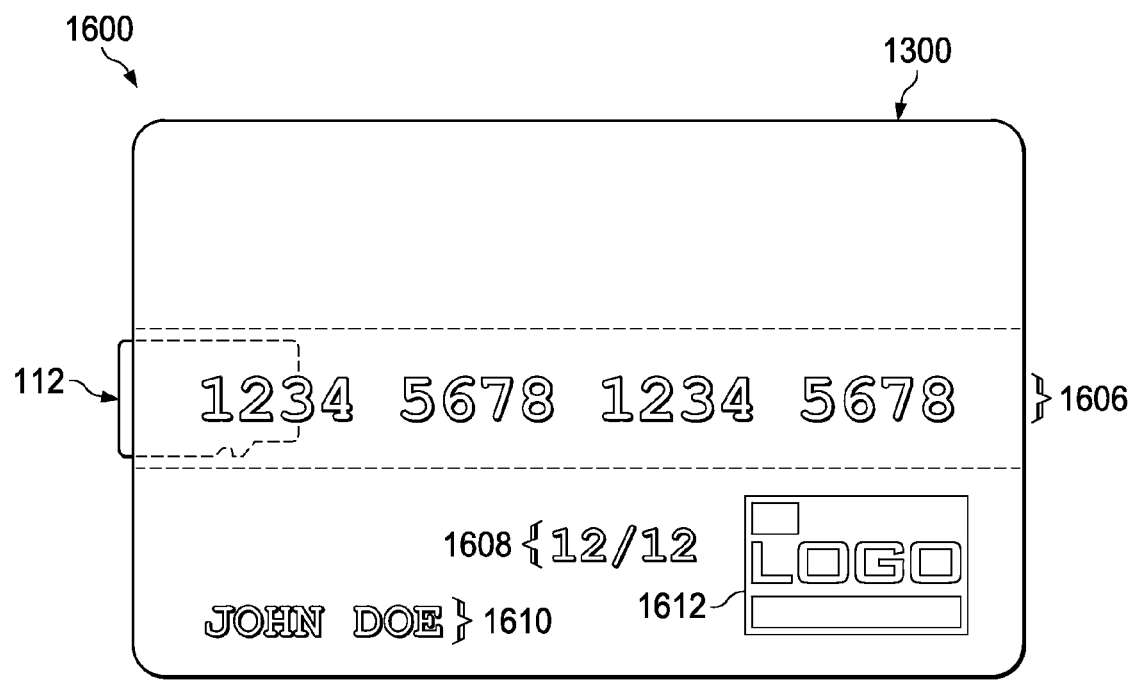
FIGS. 16A-C illustrate an example card element of FIG. 13A.
Figure 16B:
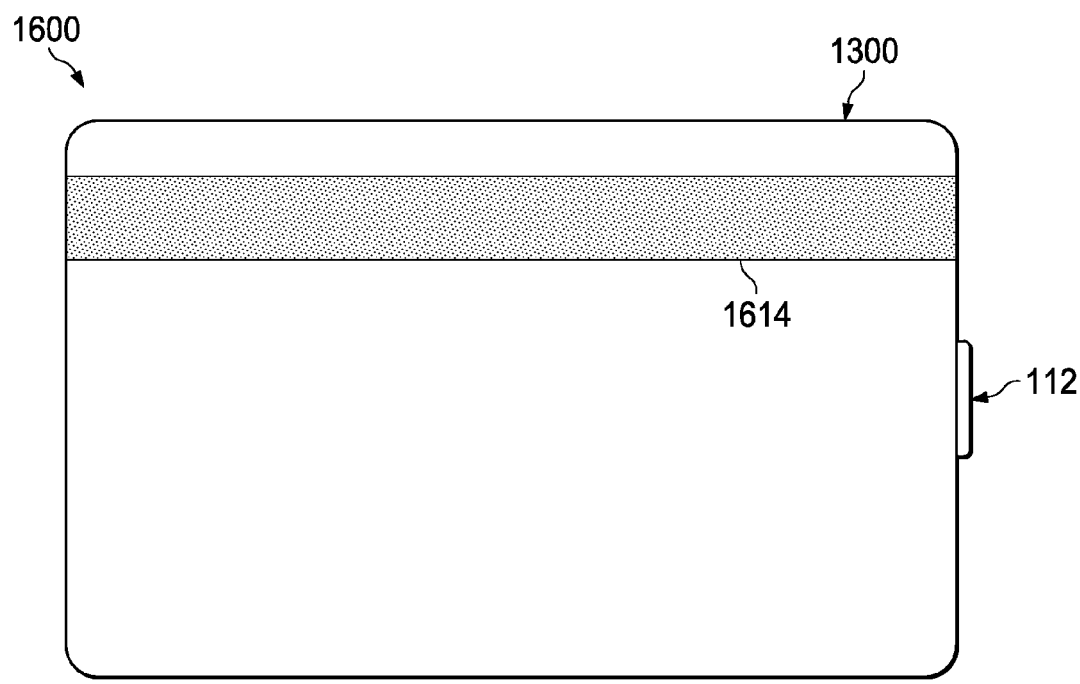
Figure 16C:
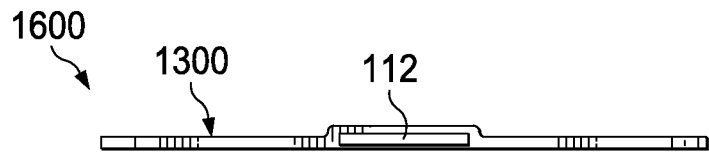

FIGS. 16A-C illustrate different views of the card system 1600 for executing financial transactions. For example, the card system 1600 may execute wireless transactions as well as contact transactions (e.g., magnetic stripe). In this implementation, the card system 1600 includes a card element 1300 and a transaction card 112 inserted into the card element 1300. The card element 1300 may include one or more elements associated with a credit card or debit card. For example, the card element 1300 may be embossed with an account number 1606, an expiration date 1608, an account holder's name 1610, and/or other information. In addition, the card element 1300 may include a logo 1612 to identify a type of account (e.g., Visa, MasterCard). In the illustrated implementation, the card element 1300 forms an opening that receives the transaction card 112. The card element 1300 may enclose or otherwise include an antenna (not illustrated) that connects to the transaction card 1604 during insertion. As illustrated in FIG. 16B, the card element 1300 may include a magnetic strip 1614 for executing contact transactions. For example, POS devices that include magnetic readers may determine information encoded on the magnetic stripe 1614 to execute transactions. The magnetic stripe may at least identify one or more of the following: card holder name, card holder account number, expiry date, and/or other information.

Figure 17:
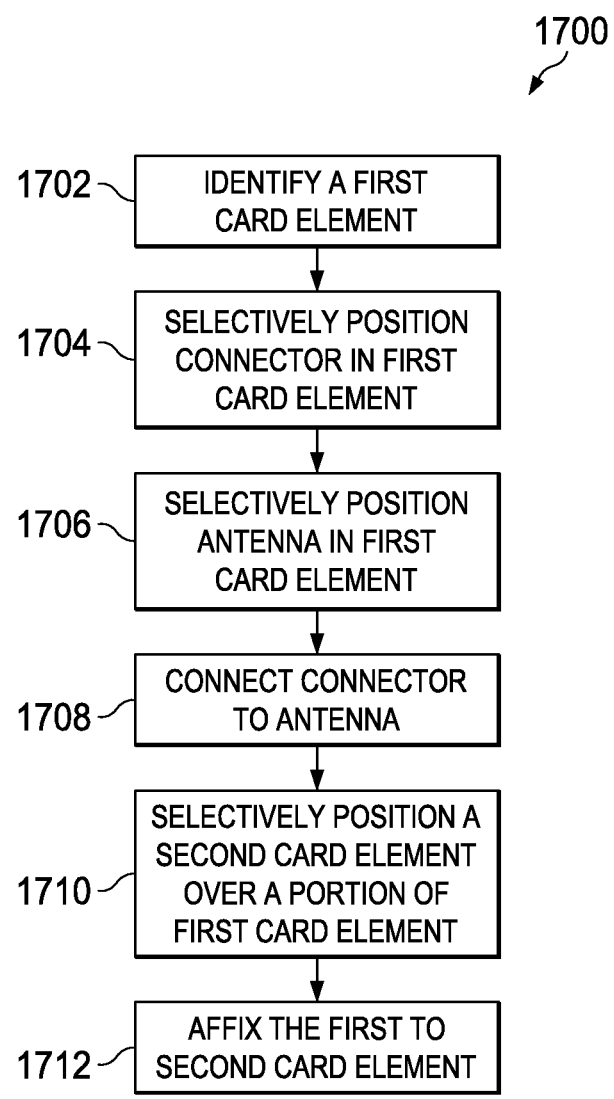
FIG. 17 is a flow chart illustrating an example method for manufacturing card elements.

FIG. 17 is a flow chart illustrating an example method for manufacturing card elements 1300 of FIG. 13. In general, the card element 1300 is manufactured by affixing two elements together to form an opening to receive a transaction card 112 and connect to an enclosed antenna 1302. Many of the steps in this flowchart may take place simultaneously and/or in different orders as shown. The system 100 may use methods with additional steps, fewer steps, and/or different steps, so long as the methods remain appropriate.

Method 1700 begins at step 1702 wherein a first card element is identified. For example, the card element 1402 may be identified. At step 1704, a connector is selectively position in the first card element. In the example, the connector 1304 may be selectively positioned in the bottom card element 1402. Next, at step 1706, an antenna is selectively positioned in the first card element. As for the example, the antenna 1302 may be selectively positioned in the bottom card element 1402. The antenna and the connector are connected at step 1708. Again in the example, the connector 1304 may be connected (e.g., soldered) to the antenna 1302. At step 1710, a second card element s selectively positioned to overlap at least a portion of the first card element. Returning to the example, the top card element 502 may be positioned over the bottom card element 1402 to form an opening 1306 and enclose the antenna 1302 and the connector 1304. Next, at step 1712, the first card element is affixed to the second card element. In the example, the bottom card element 1402 and the top card element 1502 may be fused or otherwise affixed to form the card element 1300.

Figure 18A:
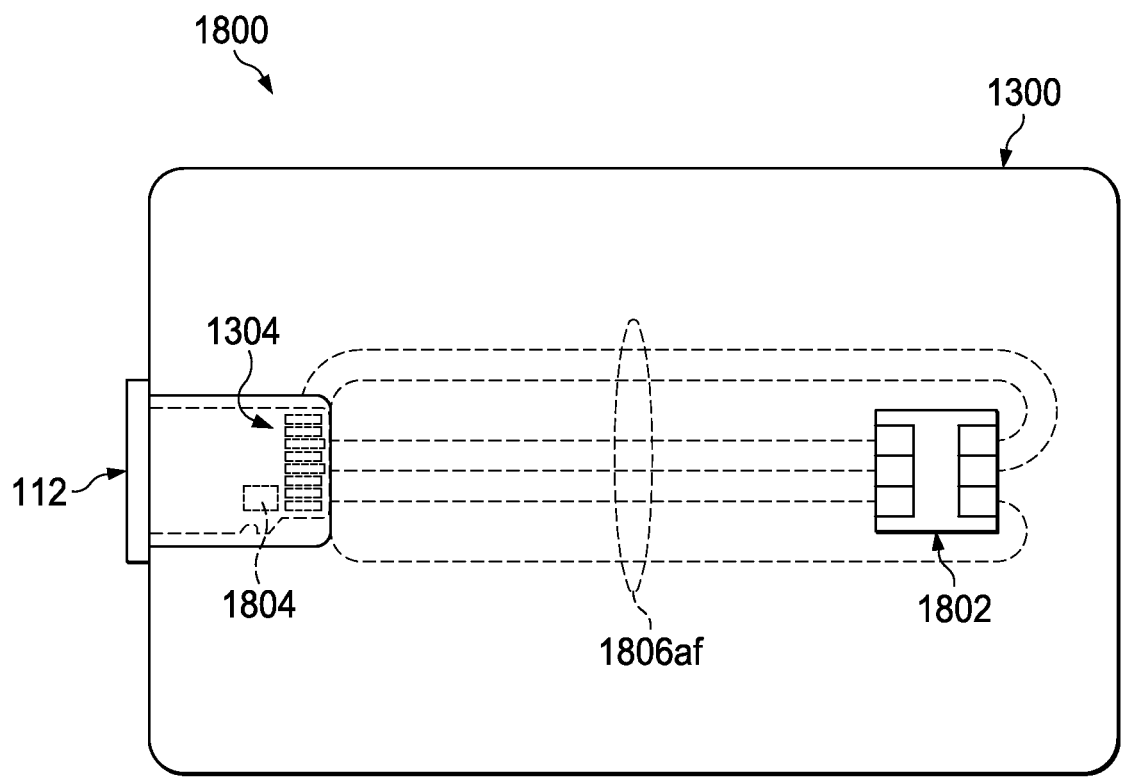
FIGS. 18A-C illustrate an example card system including a smart-card interface.
Figure 18B:
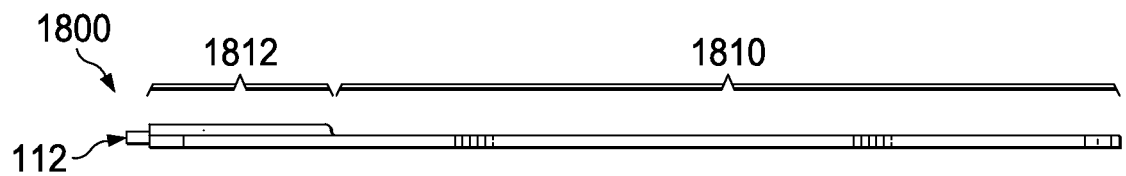
Figure 18C:
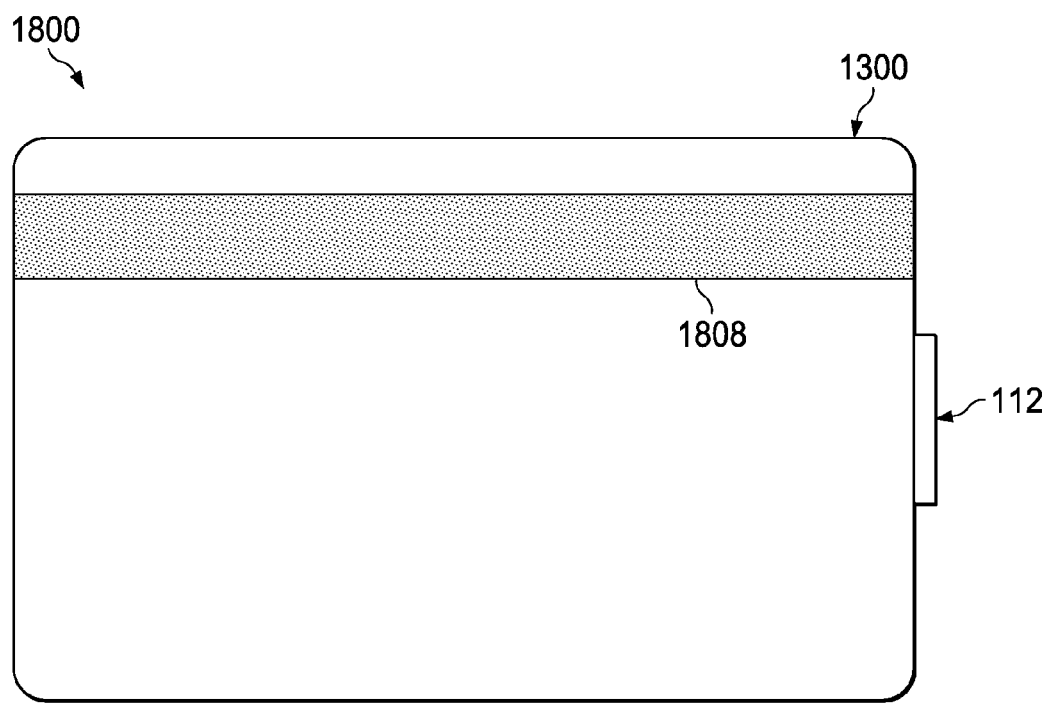

FIGS. 18A-C illustrate different views of a card system 1800 that executes both contactless and contact payments. For example, the card system 1800 may execute wireless transactions as well as contact transactions using, for example, a smart card interface 1802. Generally, a card including a smart card interface may be inserted into a smart card terminal such that the terminal forms electrical connections with the interface. In the illustrated implementations, the smart card interface 1802 is connected, through the electrical connections 1806a-f, to a smart-card module 1804 in the transaction card 112. The electrical connections 1806a-f are enclosed in the card element 1300 and are connected to the connectors 1304. In these examples, the transaction card 112 connects to the interface 1802 during insertion. The card system 1800 may include dimensions in accordance with the ID-1 of ISO/IEC 7810 standard that defines them as 85.60× 53.98 mm. Some card systems 180 may have dimensions according to ID-000 which is 25×15 mm (commonly used in SIM cards). Both standards are 0.76 mm thick. Referring to FIG. 18B, the card element 1300 includes a portion 1810 with a first width smaller than a second width for a second portion 1812. In some implementations, the first width may be about 0.76 mm thick. In these instances, the first portion 1810 may be inserted in smart-card terminals, ATMs, and/or other terminals to execute contact transactions. The transaction card 112 may communicate with the terminals using the interface 1802 and the connections 1806a-f.

As previously discussed, the card system 1800 may include one or more elements associated with a credit card, debit card, prepaid card, and/or a gift card. For example, the card element 1300 may be embossed with an account number 1606, an expiration date 1608, an account holder's name 1610, and/or other information (see FIGS. 16A-C). In addition, the card element 1300 may include a logo 1612 to identify a type of account (e.g., Visa, MasterCard). In the illustrated implementation, the card element 1300 forms an opening that receives the transaction card 112. The card element 1300 may enclose or otherwise include an antenna (not illustrated) that connects to the transaction card 112 during insertion. As illustrated in FIG. 18C, the card system 1800 may include a magnetic strip 1808 for executing contact transactions. In some implementations, the card system 1800 may execute two different types of contact transactions such as transactions using the magnetic stripe 1808 and transactions using the smart-card interface 1802.

Figure 19:
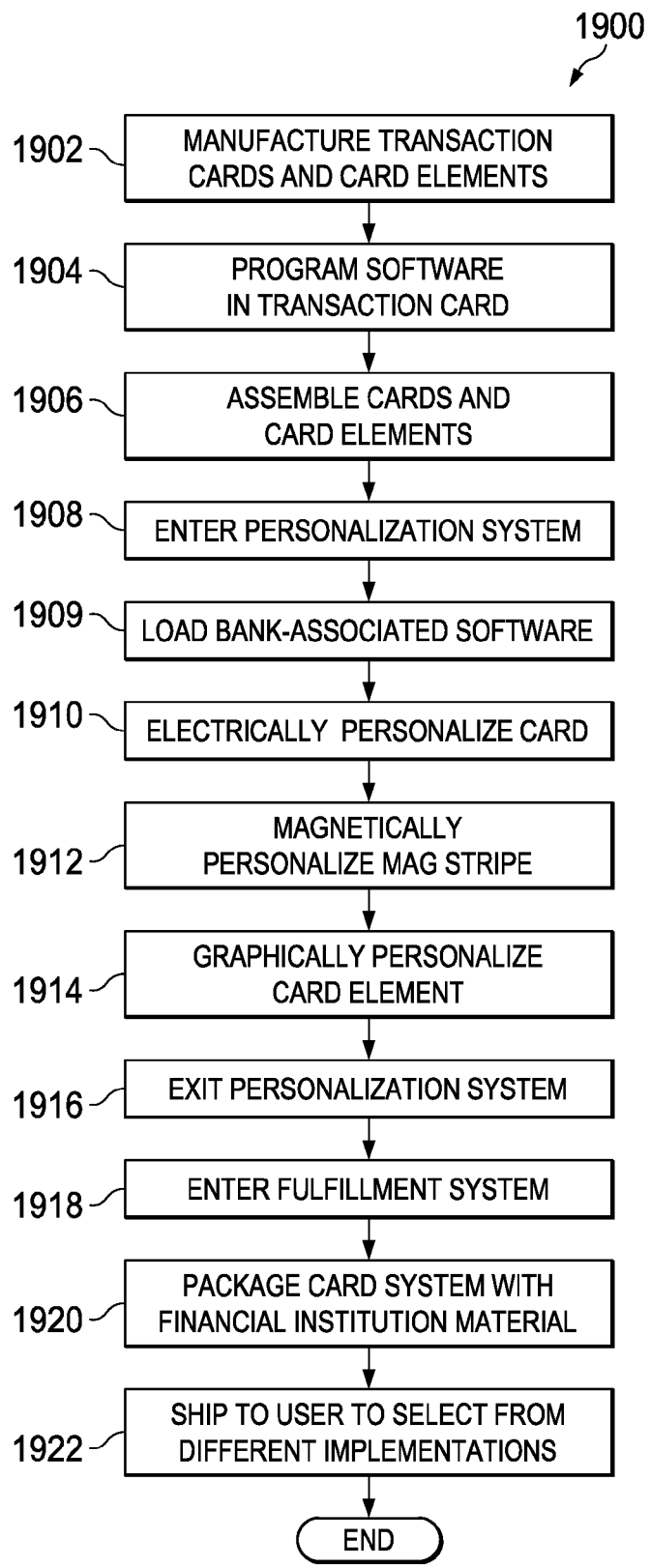
FIG. 19 is a flow chart illustrating an example method for personalizing a card system.

FIG. 19 is a flow chart illustrating an example method 1900 for personalizing card systems. For example, the method 1900 may personalize both the transaction card 112 and the card element 1300. In general, the card system is manufactured, personalized, fulfilled, and delivered to the user. Many of the steps in this flowchart may take place simultaneously and/or in different orders as shown. The system 100 may use methods with additional steps, fewer steps, and/or different steps, so long as the methods remain appropriate.

To begin with, the method 1900 includes four main processes: (1) manufacturing from steps 1902 to 1906; (2) personalization from steps 1908 to 1916; (3) fulfillment from steps 1918 to 1920; and (4) delivery at step 1922. As for the manufacturing process, the method 1900 includes step 1902 where the transaction card and the card element are manufactured. For example, the transaction card 112 and the card element 1300 may be manufactured separately. At step 1904, software is loaded on the transaction card such as firmware for executing wireless transactions and/or other modules previous discussed. While the method indicates the software is loaded during the manufacturing process, the software may be loaded during the other processes such as, for example, the personalization process. For example, parts of the software may be loaded during the manufacturing process (e.g., OS, application) and parts of the software may be loaded during the personalization process (e.g., batch-specific parts, bank-specific customization). Next, at step 1906, the transaction card and the card element are assembled. In the example, the transaction card 112 may be inserted in, snapped into, or otherwise connected to the card element 1300. Turning to the personalization process, the card system enters the personalization system at step 1908. At step 1909, bank-associated software is loaded on the transaction card such as, for example, a bank user interface. The card is electronically personalized at step 1910, where electrical personalization may include the payment application and the user credentials. As for the example, the transaction card 112 may be uploaded with personal information, payment applications as well as other information associated with the user. Next, at step 1912, the magnetic stripe on the card element may be magnetically personalized. Again in the example, the mag stripe 1614 may be encoded with an account number, a user name, expiration date and/or other information. The card element is graphically personalized at step 1914. In the example, the card element 1300 may be embossed with the name, account number, expiration date and/or information associated with the associated financial account. The card system leaves the personalization system at step 1916 and enters the fulfillment system at step 1918. At step 1920, the card system is packaged with materials from the associated institution such as instructions, coupons, and/or other materials. Next, at step 1922, the card system is mailed to the user, which includes a plurality of different implementations, For example, the card system 1800 may be used by the user using a contactless interface, a mag stripe, and/or a smart-card interface, and may be inserted into a mobile device for wireless transactions.

A number of embodiments of the invention have been described. Nevertheless, it will be understood that various modifications may be made without departing from the spirit and scope of the invention. Accordingly, other embodiments are within the scope of the following claims.

What is claimed is:

1. A method, comprising:
    identifying a bottom element including a first portion that forms a cavity for receiving a first enclosed antenna and a second portion that receives a connector;
    selectively positioning the first enclosed antenna in the cavity formed by the first portion;
    selectively positioning the connector in the second portion;
    electrically connecting the first enclosed antenna and the connector;
    selectively positioning a top element to overlap the bottom element, the overlapped top element and the bottom element form an opening, when combined, configured to receive a transaction device, including a second enclosed antenna, configured to wirelessly execute transactions using the first enclosed antenna or an antenna internal to the transaction device; and
    affixing the top element to the bottom element to form a card element that encloses the first enclosed antenna and at least a portion of the connector and connects the first enclosed antenna, using the connector, to the transaction device during insertion, wherein the card element is substantially rectangular, includes a first portion with a first thickness and a second portion with a second thickness different from the first thickness and at least the thickness of the transaction card and a magnetic stripe adjacent an outer surface of the card element and encoding information for executing contact transactions with transaction terminals.

2. The method of claim 1, further comprising inserting the transaction device in the card element to form a card system to connect the transaction device to the first enclosed antenna for personalization using a current personalization system.

3. The method of claim 1, further comprising inserting the transaction device in the card element to form a card system and connect the transaction device to a smart-card contact pad for personalization.

4. The method of claim 3, further personalizing the card system independent of modifying operating aspects of conventional personalization system.

5. The method of claim 4, the personalization comprises at least one of electric personalization, magnetic personalization, or graphical personalization.

6. The method of claim 5, the electric personalization further comprising personalizing a secure element in the transaction device to encode transaction application, security information and user data, the user data comprising at least an account number, a name, and an expiration date.

7. The method of claim 5, further comprising graphically personalizing by marking or embossing the card element with identification data comprising at least a serial number, an account number, a name, and an expiration date, the identification data matches the user data encoded in the transaction card.

8. The method of claim 1, further comprising personalizing a magnetic strip on the card element with user data including at least an account number, a name, and an expiration date, the user data in the magnetic strip matches user data encoded in the transaction card.

9. A method, comprising:
   identifying a bottom element that receives a connector;
   identifying a top element that contains a cavity to receive a smart card contact pad;
   selectively positioning the smart card contact pad in the cavity in the top element;
   selectively positioning the connector in the bottom element;
   electrically connecting the smart card contact pad and the connector;
   selectively positioning the top element to overlap the bottom element, the overlapped top element and the bottom element form an opening, when combined, configured to receive an SD card; and
   affixing the top element to the bottom element to form a card element that encloses a least a portion of the smart card contact pad and at least a portion of the connector and connects an inserted SD card to the smart card contact pad using the connector, wherein the card element is substantially rectangular, includes a first portion with a first thickness and a second portion with a second thickness different from the first thickness and at least the thickness of the transaction card, and a magnetic stripe adjacent an outer surface of the card element and encoding information for executing contact transactions with transaction terminals, and the smart card contact pad is configure to connect to smart card terminals external to the card element.

10. The method of claim 9, further comprising inserting a transaction card in the card element to form a card system and connect the transaction card to the smart-card contact pad for personalization.

11. The method of claim 10, further personalizing the card system independent of modifying operating aspects of conventional personalization system.

12. The method of claim 11, the personalization comprises at least one of electric personalization, magnetic personalization, or graphical personalization.

13. The method of claim 12, the electric personalization further comprising personalizing a secure element in the transaction card to encode transaction application, security information and user data, the user data comprising at least an account number, a name, and an expiration date.

14. The method of claim 13, further comprising personalizing a magnetic strip on the card element with user data including at least an account number, a name, and an expiration date, the user data in the magnetic strip matches the user data encoded in the transaction card.

15. The method of claim 14, further comprising graphically personalizing by marking or embossing the card element with identification data comprising at least a serial number, an account number, a name, and an expiration date, the identification data matches the user data encoded in the transaction card.

* * * * *